(12) United States Patent
Kuroyanagi et al.

(10) Patent No.: US 10,030,650 B2
(45) Date of Patent: Jul. 24, 2018

(54) HIGH PRESSURE PUMP HAVING UNITARY DISCHARGE AND RELIEF VALVE

(71) Applicant: DENSO CORPORATION, Kariya, Aichi-pref. (JP)

(72) Inventors: Masatoshi Kuroyanagi, Kariya (JP); Shinobu Oikawa, Kariya (JP); Tatsuro Koga, Kariya (JP)

(73) Assignee: DENSO CORPORATION, Kariya (JP)

( * ) Notice: Subject to any disclaimer, the term of this patent is extended or adjusted under 35 U.S.C. 154(b) by 360 days.

(21) Appl. No.: 14/872,794

(22) Filed: Oct. 1, 2015

(65) Prior Publication Data

US 2016/0025054 A1  Jan. 28, 2016

Related U.S. Application Data

(62) Division of application No. 13/433,521, filed on Mar. 29, 2012, now Pat. No. 9,181,944.

(30) Foreign Application Priority Data

Mar. 31, 2011  (JP) .................................. 2011-77655
Aug. 31, 2011  (JP) ................................. 2011-188386
Aug. 31, 2011  (JP) ................................. 2011-188440

(51) Int. Cl.
*F04B 53/10*  (2006.01)
*F04B 17/05*  (2006.01)
(Continued)

(52) U.S. Cl.
CPC .......... *F04B 53/109* (2013.01); *F04B 1/0404* (2013.01); *F04B 19/22* (2013.01);
(Continued)

(58) Field of Classification Search
CPC ... F16K 17/18; F02M 59/025; F04B 53/1087; F04B 19/22; F04B 49/035; F04B 1/0404; F04B 53/109
See application file for complete search history.

(56) References Cited

U.S. PATENT DOCUMENTS 2,463,374 A * 3/1949 Garday .................. F02M 59/26
417/428
4,412,792 A * 11/1983 LaBorde ............... F04B 53/109
137/454.4
(Continued)

FOREIGN PATENT DOCUMENTS

JP  B-137801  5/1940
JP  59-177772  11/1984
(Continued)

OTHER PUBLICATIONS

Machine translation, AIPN system, JPO JP,02-132847,U1; 7 pages; Oct. 13, 2017.*
(Continued)

*Primary Examiner* — Bryan Lettman
*Assistant Examiner* — Timothy Solak
(74) *Attorney, Agent, or Firm* — Nixon & Vanderhye P.C.

(57) ABSTRACT

A valve body is provided with a discharge relief portion. A relief valve outlet is formed in an end face thereof on a central axis of the valve body. Discharge valve inlets are point-symmetrically formed with respect to the central axis. A discharge valve outlet is formed in another end face thereof and relief valve inlets are point-symmetrically formed with respect to the central axis. A discharge valve outlet and the discharge valve inlets communicate with each other. A flow of fuel from a pressurization chamber to a fuel discharge port is restricted by a discharge valve member capable of closing the discharge valve outlet. The relief valve outlet and the relief valve inlets communicate with (Continued)

each other. A flow of fuel from the fuel discharge port to the pressurization chamber is restricted by a relief valve member capable of closing the relief valve outlet.

10 Claims, 13 Drawing Sheets

(51) Int. Cl.
| | |
|---|---|
| *F04B 1/04* | (2006.01) |
| *F04B 53/14* | (2006.01) |
| *F04B 19/22* | (2006.01) |
| *F04B 49/035* | (2006.01) |
| *F04C 14/26* | (2006.01) |
| *F04B 49/24* | (2006.01) |
| *F04B 53/16* | (2006.01) |
| *F04B 53/00* | (2006.01) |
| *F16K 17/04* | (2006.01) |

(52) U.S. Cl.
CPC ............ *F04B 49/035* (2013.01); *F04B 49/24* (2013.01); *F04B 53/1087* (2013.01); *F04B 53/14* (2013.01); *F04B 53/16* (2013.01); *F04C 14/26* (2013.01); *F04B 17/05* (2013.01); *F04B 53/00* (2013.01); *F16K 17/048* (2013.01)

(56) References Cited

U.S. PATENT DOCUMENTS

| | | | |
|---|---|---|---|
| 4,428,396 A | | 1/1984 | Wall |
| 4,459,086 A | * | 7/1984 | Hafele ................ F02M 59/462 137/493.5 |
| 4,747,475 A | | 5/1988 | Hagwood et al. |
| 5,012,785 A | | 5/1991 | Long et al. |
| 6,113,365 A | * | 9/2000 | Siegel ................... F04B 1/0404 417/434 |
| 7,401,593 B2 | | 7/2008 | Rembold et al. |
| 8,132,558 B2 | * | 3/2012 | Lucas ................. F02M 59/366 123/510 |
| 2002/0074042 A1 | | 6/2002 | Olivas et al. |
| 2008/0289694 A1 | * | 11/2008 | Edwards ............... F16K 17/403 137/70 |
| 2011/0126804 A1 | | 6/2011 | Lucas et al. |

FOREIGN PATENT DOCUMENTS

| | | | | |
|---|---|---|---|---|
| JP | 60-119366 | | 6/1985 | |
| JP | 63-26768 | | 2/1988 | |
| JP | 02-132847 | * | 11/1990 | ............. F02M 59/46 |
| JP | 2-132847 | | 11/1990 | |
| JP | 2004-138062 | | 5/2004 | |
| JP | 2004-218547 | | 8/2004 | |
| JP | 2010-174903 | | 8/2010 | |

OTHER PUBLICATIONS

Kuroyanagi et al., U.S. Appl. No. 13/433,521, filed Mar. 29, 2012.
Aug. 15, 2013 Office Action issued in corresponding Japanese Application No. 2011-188386 (with English-language translation).
Jul. 12, 2013 Office Action issued in corresponding Japanese Application No. 2011-077655 (with English-language translation).

* cited by examiner

HIGH PRESSURE PUMP HAVING UNITARY DISCHARGE AND RELIEF VALVE

CROSS-REFERENCE TO RELATED APPLICATION

This application is a divisional of U.S. patent application Ser. No. 13/433,521, filed Mar. 29, 2012, now U.S. Pat. No. 9,181,944, which claims priority to Japanese Patent Applications No. 2011-77655 filed on Mar. 31, 2011, No. 2011-188386 filed on Aug. 31, 2011 and No. 2011-188440 filed on Aug. 31, 2011, the disclosures of which are incorporated herein by reference.

TECHNICAL FIELD

The present invention relates to a high-pressure pump used for an internal combustion engine.

BACKGROUND

In a fuel supply apparatus for supplying a fuel to an internal combustion engine, a high-pressure fuel supplied from a high-pressure pump is accumulated in a fuel accumulator. The accumulated high-pressure fuel is injected into a combustion chamber of the engine through a fuel injector. A high-pressure pump is equipped with a relief valve. When the fuel pressure in the fuel accumulator is excessively raised beyond an allowable value due to a malfunction in a suction valve or a discharge valve of the high-pressure valve, the relief valve is opened to relieve the high-pressure fuel into a return passage.

In a high-pressure pump shown in JP-2004-138062A, a discharge passage and a relief passage are arranged in parallel with each other. The discharge passage is formed for pressure-feeding the fuel in a pressurization chamber to a discharge port through a discharge valve. The relief passage is formed for returning the fuel of excessive pressure in a fuel accumulator from the discharge port to the pressurization chamber through a relief valve. When the high-pressure pump discharges the fuel, the fuel pressure in the pressurization chamber acts to open the discharge valve, and simultaneously acts in such a direction that the relief valve is abutted against a seat portion. Therefore, even when the fuel pressure in the pressurization chamber exceeds a relief valve opening pressure at the time of discharge, the relief valve is not opened. As a result, a part of discharged fuel is prevented from flowing out of the relief valve and the accuracy of metering is ensured.

In the high-pressure pump shown in JP-2004-138062A, a chamber for accommodating the discharge valve and a chamber for accommodating the relief valve are separately independently formed in a housing, whereby a lot of high-pressure seals are necessary therebetween.

In the high-pressure pump shown in U.S. Pat. No. 7,401,593 B2, a chamber for accommodating a discharge valve and a chamber for accommodating a relief valve are separately formed in a bottom of one large hole (chamber). Then, a discharge connector is joined to the opening of the large hole. The number of points where a high-pressure seal is necessary is thereby reduced.

In the high-pressure pump shown in JP-2010-174903A, a fuel is returned to a low-pressure area, not to a pressurization chamber, when a relief valve is opened. When the fuel is discharged, the relief passage from the discharge port to the relief valve is closed in conjunction with a lifting of a discharge valve. As a result, when the fuel pressure in a pressurization chamber exceeds a relief valve opening pressure, it can be avoided that the relief valve is opened and a part of discharged fuel flows out, so that an accuracy of metering is ensured.

In the high-pressure pump disclosed in JP-2004-138062A, a cylindrical member forming the valve seat of the discharge valve is press-inserted into an inner wall of the housing of the high-pressure pump. For this reason, a force from the inner wall of the housing is exerted on the cylindrical member forming the valve seat of the discharge valve in an inward radial direction.

In the high-pressure pump disclosed in U.S. Pat. No. 7,401,593 B2, a closed-end cylindrical holder is welded or calked on the outer wall of a member forming the valve seat of the discharge valve. The holder holds a biasing member for biasing a discharge valve member in a valve-close direction. For this reason, a force from the holder is exerted on the member forming the valve seat of the discharge valve in the inward radial direction due to welding or calking.

In the high-pressure pumps disclosed in JP-2004-138062A and U.S. Pat. No. 7,401,593 B2, a discharge passage and a relief passage are arranged in parallel with each other and both of them communicate with a pressurization chamber. For this reason, in addition to the fuel in the pressurization chamber, the fuel in the discharge passage and the relief passage is simultaneously pressurized during a pressurization stroke. That is, in the high-pressure pumps in JP-2004-138062A and U.S. Pat. No. 7,401,593 B2, "dead volume" other than the pressurization chamber is increased, which deteriorates a discharging efficiency of a high-pressure pump.

In the high-pressure pump shown in JP-2010-174903A, the dead volume is not increased. However, the configuration of a discharge valve is complicated and high machining accuracy is required, which increases its manufacturing cost. A fuel pressure pulsation in the high-pressure pipe from the high-pressure pump to the fuel accumulator has great influence on the lift of the discharge valve. The fuel pressure pulsation is varied depending on a bend position, a bend angle, and the like in high-pressure pipe as well as the engine speed and the discharge rate of a pump. It is necessary to tune various elements of a discharge valve for individual engines. This increases a manufacturing cost.

In the high-pressure pumps shown in JP-2004-138062A, U.S. Pat. No. 7,401,593 B2, and JP-2010-174903A, a discharge valve and a relief valve are provided in different passages and it is necessary to form chambers accommodating the both valves. This increases a physical size of the housing and its manufacturing cost.

When a force from the inner wall of the housing is exerted on a member forming the valve seat of a discharge valve in the inward radial direction, there is a possibility that the valve seat portion is deformed. When the valve seat portion is deformed, the tight abutment between the valve seat and a discharge valve member is prevented and there is a possibility that discharge pressure is reduced or destabilized.

In the high-pressure pump shown in JP-2004-138062A, a member forming the valve seat of the discharge valve is just press-inserted into the inner wall of the housing. Therefore, it is likely that the member may get out of the inner wall of the housing due to an internal pressure established when the high-pressure pump is in operation.

Also, the high-pressure pump in JP-2004-138062A is provided with the relief valve for returning the fuel to the pressurization chamber of the high-pressure pump when the fuel pressure becomes greater than a predetermined value. A cylindrical member forming the valve seat of this relief valve is press-inserted into the inner wall of the housing of the high-pressure pump. Therefore, the same problem as mentioned above may occur with respect to the member forming the valve seat of the relief valve.

When a force from a holder is exerted on the member forming the valve seat of the discharge valve in the inward radial direction, there is a possibility that the valve seat portion is deformed. When the valve seat portion is deformed, the tight abutment between the valve seat and a discharge valve member is prevented and there is a possibility that discharge pressure is reduced or destabilized.

Also, the high-pressure pump in U.S. Pat. No. 7,401,593 B2 is provided with the relief valve for returning fuel to the pressurization chamber of the high-pressure pump when the pressure of fuel becomes greater than a predetermined pressure. A closed-end cylindrical holder that holds a biasing member for biasing a relief valve member in a valve-close direction is welded or calked on the outer wall of a member forming the valve seat of this relief valve. Therefore, the same problem as mentioned above may occur with respect to the member forming the valve seat of the relief valve.

SUMMARY

It is an object of the present disclosure to provide a high-pressure pump in which a discharge valve and a relief valve are simplified in their configuration and a discharging efficiency is enhanced.

It is another object of the present disclosure to provide a high-pressure pump in which it is possible to suppress a deformation in a member forming a valve seat.

A high-pressure pump includes a plunger, a cylinder and a housing. The cylinder accommodates the plunger so that it can be reciprocatively moved in the axial direction. The cylinder defines a pressurization chamber in cooperation with the outer wall of the plunger. The housing accommodates the cylinder and defines a fuel passage for discharging the fuel pressurized in the pressurization chamber.

A valve body connected to the housing includes a discharge valve inlet and a relief valve outlet which communicate with the fuel passage, a discharge valve outlet, a relief valve inlet, a discharge valve passage fluidly connecting the discharge valve inlet and the discharge valve outlet, and a relief valve passage communicating with the relief valve inlet and the relief valve outlet.

The relief valve passage is fluidly disconnected with the discharge valve passage. A discharge valve seat is formed on an end face of the valve body opposite to the pressurization chamber. A relief valve seat is formed on another end face of the valve body confronting the pressurization chamber. The discharge valve member is provided in such a manner as to abut against the discharge valve seat. The relief valve member is provided in series with the discharge valve member in an axial direction of the valve body so as to abut against the relief valve seat. A discharge valve biasing portion biases the discharge valve member in a direction in which the discharge valve member is seated on the discharge valve seat. A relief valve biasing portion biases the relief valve member in a direction in which the relief valve member is seated on the relief valve seat.

A first pressure force is exerted on the discharge valve member confronting the pressurization chamber by the fuel pressure in the pressurization chamber.

A second pressure force is exerted on the discharge valve member opposite to the pressurization chamber. When the first pressure force is lower than or equal to a discharge valve acting force that is a resultant force of the second pressure force and the biasing force of the discharge valve biasing portion, the discharge valve member is seated on the discharge valve seat to close the discharge valve outlet.

As a result, a fuel flow from the pressurization chamber is interrupted. When the first pressure force is larger than the discharge valve acting force, the discharge valve member is unseated from the discharge valve seat to open the discharge valve outlet. As a result, the fuel flow from the pressurization chamber is permitted.

A third pressure force is exerted on the relief valve member opposed to the pressurization chamber. A fourth pressure force is exerted on the relief valve member confronting to the pressurization chamber by the fuel pressure in the pressurization chamber side.

When the third pressure force is lower than or equal to the relief valve acting force that is a resultant force of the fourth pressure force and the biasing force of the relief valve biasing portion, the relief valve member is seated on the relief valve seat to close the relief valve outlet. As a result, the fuel flow toward the pressurization chamber is interrupted.

When the third pressure force is larger than the relief valve acting force, the relief valve member is unseated from the relief valve seat to open the relief valve outlet. As a result, the fuel flow toward the pressurization chamber is permitted.

The discharge valve seat and the relief valve seat are provided in the one valve body so that they are opposed to each other. Therefore, the discharge valve and the relief valve can be arranged in series in the direction of the axis of the valve body. Two different valves are accommodated in one passage. Therefore, the configuration can be simplified as compared with conventional technologies in which a discharge valve and a relief valve are arranged in different passages. The physical sizes of the discharge valve and the relief valve can be reduced. In addition, the manufacturing cost can be reduced.

The discharge valve passage for the discharge valve and the relief valve passage for the relief valve are formed in a single valve body. This makes it possible to reduce the volume required for passages used for the two valves. Therefore, a dead volume that is a pressurized volumetric capacity other than the pressurization chamber can be reduced. The discharging efficiency of the high-pressure pump can be enhanced.

The discharge valve passage and the relief valve passage are formed in a single valve body, and the discharge valve member, the relief valve member, the discharge valve energizing portion and the relief valve energizing portion are arranged therein. The discharge portion of the high-pressure pump is configured as a sub-assembly. With this configuration, advantages (i) to (iii) described below are obtained when the high-pressure pump is manufactured.

(i) The discharge relief valve unit can be produced in a sub-assembly line which is independent from a main assembly line for the high-pressure pump, whereby a take time can be shortened.

(ii) When inspecting the relief valve opening pressure, a discharge relief valve unit has to be set in inspection equipment. Since the discharge relief valve unit is relatively small in its size, the inspection equipment can be also reduced in its size.

(iii) When the relief valve opening pressure is not within the predetermined range due to an inspecting equipment, it is inevitable to discard the work piece as a defective. For this reason, with the configuration in which the valve opening pressure of the relief valve is adjusted as for the entire housing, any defective must be discarded together with the housing. Meanwhile, when the discharge relief valve unit is configured as a sub-assembly, this defective discharge relief valve unit only has to be discarded and the loss cost arising from discard can be significantly reduced.

According to another aspect of the invention, the high-pressure pump includes a plunger, a cylinder, a housing, a cylindrical member, a valve body, a discharge valve member, and a discharge valve biasing portion.

The cylinder includes: a plunger accommodating hole for reciprocatively accommodating the plunger; a pressurization chamber formed by its inner wall and the outer wall of the plunger; a suction port for suctioning a fluid into a pressurization chamber; and a discharge port for discharging the fluid pressurized in the pressurization chamber.

The housing includes: a first inner wall surface forming a first discharge passage communicating with the discharge port; a second inner wall surface forming a second discharge passage communicating with the first discharge passage; and a stepped surface formed between the first inner wall surface and the second inner wall surface. An inner diameter of the second inner wall is larger than that of the first inner wall surface. The cylindrical member is so provided that one end thereof is positioned inside of the second inner wall surface of the housing.

The valve body includes: a cylindrical portion accommodated inside of the cylindrical member; a flange portion extended from the cylindrical portion confronting the pressurization chamber side in an outward radial direction and being sandwiched between one end of the cylindrical member and the stepped surface; a valve-seat-forming portion that closes the cylindrical portion opposite to the pressurization chamber; a discharge valve seat formed on the wall surface of the valve-seat-forming portion opposite to the cylindrical portion; and a discharge valve passage connecting the discharge valve seat and the wall surface of the valve-seat-forming portion.

When unseated from the discharge valve seat or seated on the discharge valve seat, the discharge valve member is capable of opening or closing the discharge valve passage. The discharge valve biasing portion biases the discharge valve member to be closed.

In the valve body, the flange portion is sandwiched between the stepped surface of the housing and one end of the cylindrical member. The valve body is held in the housing with axial force exerted on the flange portion from the stepped surface of the housing and the cylindrical member. As a result, the movement of the valve body relative to the housing in the axial direction is restricted. For this reason, the discharge pressure of the high-pressure pump can be stabilized.

An exertion of force in the inward radial direction on the valve body is suppressed. Therefore, the exertion of force in the inward radial direction on the valve-seat-forming portion of the valve body is restricted. A deformation of the valve-seat-forming portion is restricted. This makes it possible to maintain the tight abutment between the discharge valve seat and the discharge valve member. It is possible to further stabilize the discharge pressure of the high-pressure pump.

According to another aspect of the invention, a high-pressure pump includes a plunger, a cylinder, a housing, a cylindrical member, a valve body, a discharge valve member, a holder, and a discharge valve biasing portion.

The cylinder includes: a plunger accommodating hole for reciprocatively accommodating the plunger; a pressurization chamber formed by its inner wall and the outer wall of one end of the plunger; a suction port for suctioning a fluid into the pressurization chamber; and a discharge port for discharging fluid pressurized in the pressurization chamber.

The housing includes an inner wall surface forming a discharge passage communicating with the discharge port. The cylindrical member is so provided that one end thereof is positioned inside the inner wall surface of the housing and includes a first stepped surface formed between both ends.

The valve body includes: a cylindrical portion housed inside of the cylindrical member; a first valve-seat-forming portion closing the end of the cylindrical portion opposite to the pressurization chamber; a second valve-seat-forming portion protruded from the first valve-seat-forming portion opposite to the cylindrical portion; a second stepped surface formed outside the second valve-seat-forming portion; a discharge valve seat formed on the wall surface of the second valve-seat-forming portion opposite to the first valve-seat-forming portion; and a discharge valve passage connecting the discharge valve seat and the wall surface of the first valve-seat-forming portion.

When unseated from the discharge valve seat or seated on the discharge valve seat, the discharge valve member is capable of opening or closing the discharge valve passage.

The holder includes: a holder cylindrical portion having the second valve-seat-forming portion of the valve body; a holder bottom portion closing the holder cylindrical portion; a holder flange portion extended from the holder cylindrical portion in the outward radial direction and being sandwiched between the first stepped surface and the second stepped surface of the valve body; and a through hole formed in at least one of the holder cylindrical portion and the holder bottom portion. The discharge valve biasing member is provided between the discharge valve member and the holder bottom portion to bias the discharge valve member to be closed. That is, the discharge valve biasing member is held by the holder.

The holder is provided inside of the cylindrical member in such a manner that its holder flange portion is sandwiched between the first stepped surface of the cylindrical member and the second stepped surface of the valve body. The holder is held with axial force exerted on the holder flange portion from the first stepped surface and the second stepped surface. As a result, the movement of the holder relative to the cylindrical member in the axial direction is restricted.

An exertion of force in the inward radial direction on the holder is suppressed. Therefore, the exertion of force in the inward radial direction from the inner wall of the holder on the second valve-seat-forming portion is suppressed. A deformation of the second valve seat formation portion is suppressed. This makes it possible to maintain the tight abutment between the discharge valve seat and the discharge valve member. As a result, it is possible to stabilize the discharge pressure of the high-pressure pump.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
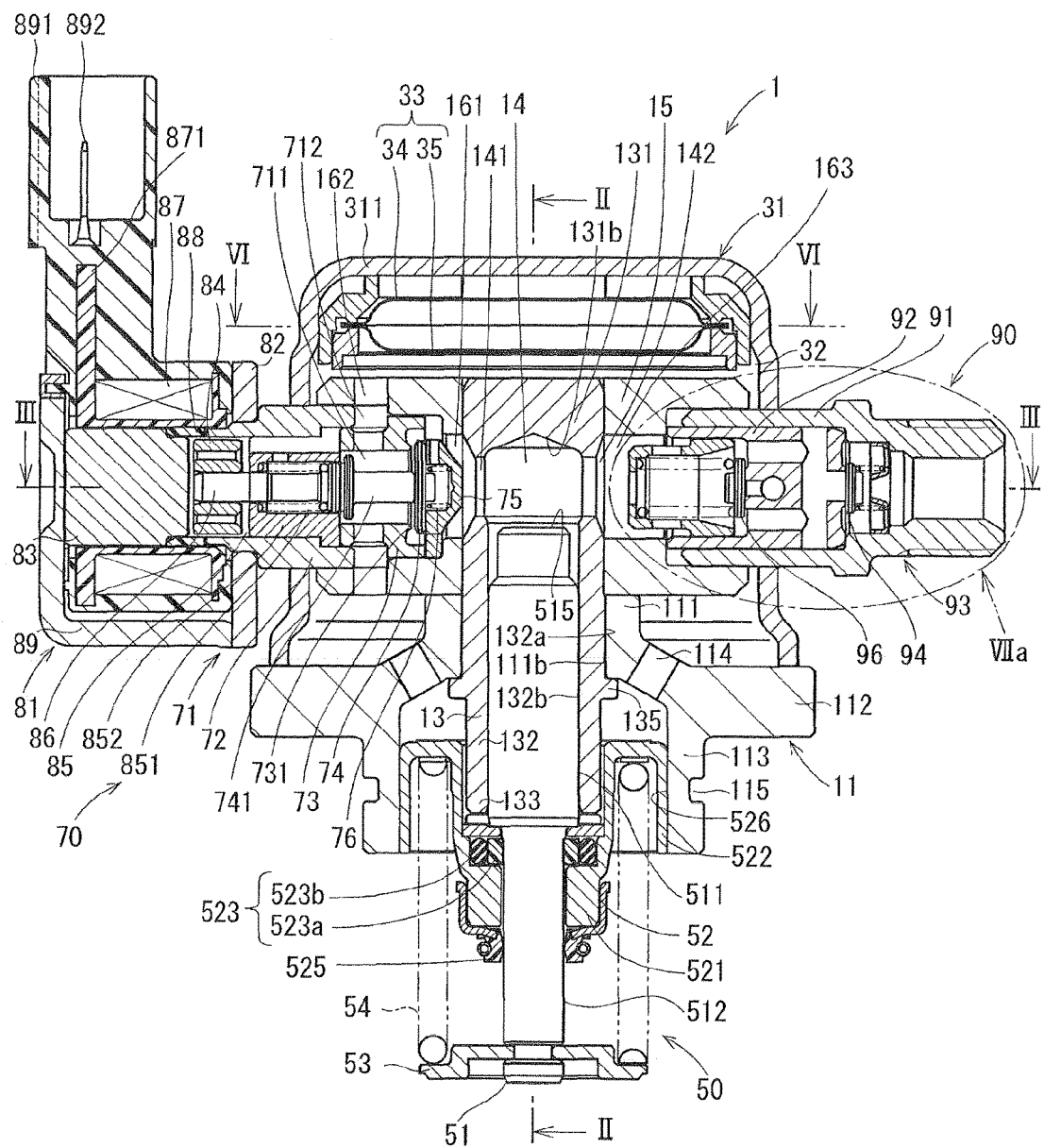
FIG. 1 is a schematic sectional view of a high-pressure pump in a first embodiment of the invention.

Hereafter, description will be given to multiple embodiments of the invention with reference to the drawings. In the drawings related to these embodiments, substantially identical constituent parts will be marked with identical reference numerals and the description thereof will be omitted.

First Embodiment

FIG. 1 to FIG. 7B illustrate a high-pressure pump 1 according to a first embodiment of the invention. The high-pressure pump 1 supplies fuel pumped up from a fuel tank (not shown) by a low-pressure pump (not shown) to a pressurization chamber 14. Then, the fuel pressurized in the pressurization chamber 14 is supplied from a discharge valve 93 to a fuel accumulator (not shown). The fuel accumulator is connected to a fuel injector. In the following description, the upper side of FIG. 1 will be taken as "up, upward or upper," and the low side of the FIG. 1 will be taken as "down, downward or lower."

The high-pressure pump 1 includes a body portion, a fuel supply portion 30, a plunger portion 50, a fuel suction portion 70, and a fuel discharge relief portion 90. The body portion includes a lower housing 11, a cylinder 13 and an upper housing 15.

The lower housing 11 includes: a cylindrical cylinder-holding-portion 111; an annular plate-like engine-mounting-portion 112 protruded from the lower part of the cylinder holding portion 111 in the outward radial direction; and a cylindrical fitting portion 113 protruded from the engine-mounting-portion 112 in an opposite direction relative to the cylinder-holding-portion 111.

In the engine-mounting-portion 112, fuel passages 114 are formed in such a manner as to penetrate the engine-mounting-portion 112. In this embodiment, two fuel passages 114 are provided at equal intervals in the circumferential direction. The outer wall of the fitting portion 113 is provided with an O-ring groove 115. An O-ring is fit in this O-ring groove 115 for liquid-tightly sealing the gap formed between the fitting portion 113 and the engine.

The cylinder 13 is in the shape of a closed-end cylinder and is open toward the engine-mounting-portion 112 relative to the cylinder-holding-portion 111. The outside wall 132a of its cylindrical portion 132 that slidably holds the plunger 51 is fixed on an inner wall 111b of the cylinder-holding-portion 111. The cylinder 13 has an annular protrusion 135 that is protruded from the outside wall 132a of the cylindrical portion 132 in the outward radial direction. The top surface of the annular protrusion 135 is abutted against the bottom surface of the cylinder-holding-portion 111. That is, the annular protrusion 135 functions as a movement restricting portion that restricts an upward movement of the cylinder 13 in the axial direction.

The cylinder 13 has the pressurization chamber 14 which is defined by an upper end face 515 of the plunger 51 inserted from the opening 133, an inside wall 132b of the cylinder 13, and an inner bottom wall 131b of the bottom portion 131. The pressurization chamber 14 is a chamber for pressurizing fuel. In this embodiment, the inside diameter of the pressurization chamber 14 is set to a value larger than the inside diameter of the cylinder 13. The cylinder 13 has the following in the outside wall 132a of the cylindrical portion 132 on the bottom portion 131 side: a suction port 141 penetrating it from the pressurization chamber 14 toward the fuel suction portion 70; and a discharge port 142 penetrating it from the pressurization chamber 14 toward the fuel discharge relief portion 90. The suction port 141 and the discharge port 142 are so formed that their inside diameters are increased as it goes to the outward radial direction. The upper end face 515 corresponds to an "outer wall" of the present invention. The inside wall 132b corresponds to an "inner wall" of the present invention.

Figure 3:
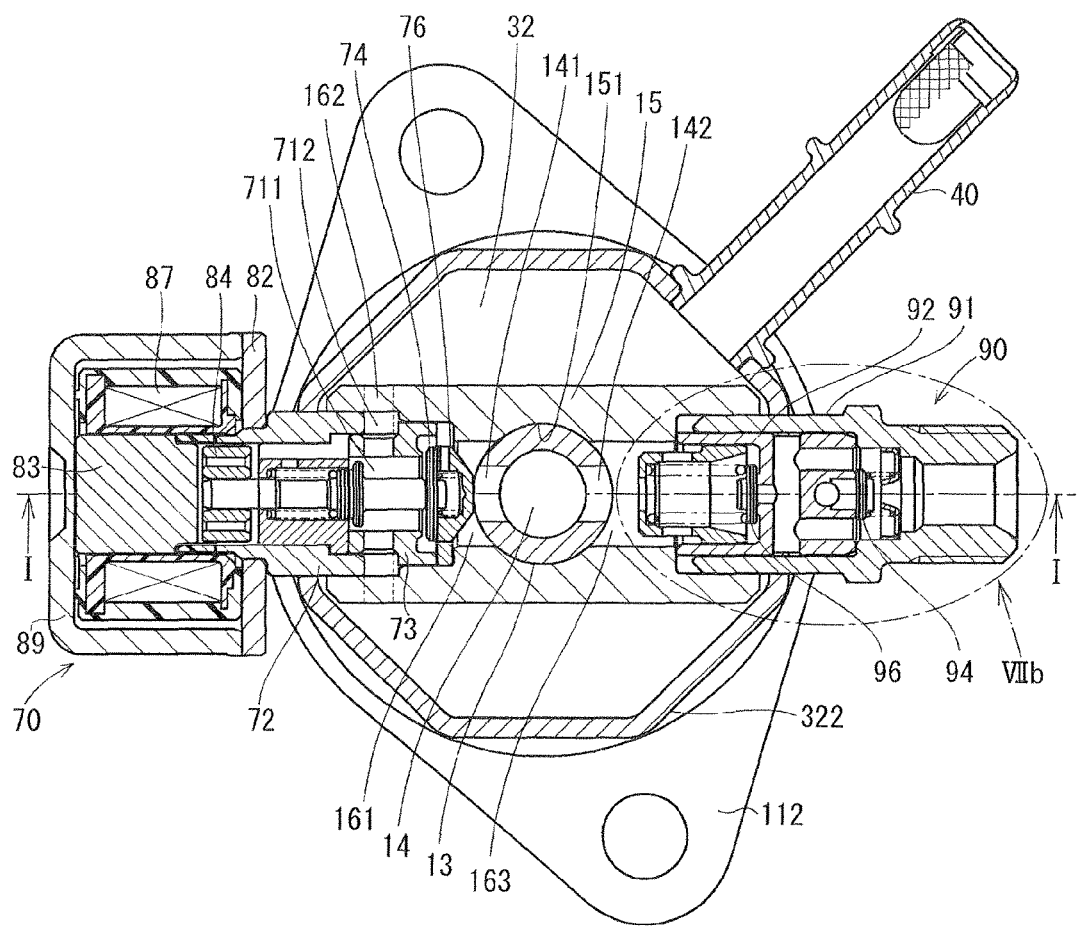
FIG. 3 is a sectional view taken along a line III-III of FIG. 1.

As illustrated in FIG. 3, the upper housing 15 is substantially in the shape of a rectangular parallelepiped extending in a direction substantially orthogonal to an axis of the cylinder 13. In the upper housing 15, the cylinder 13 is press-inserted into a cylinder housing chamber 151 formed in the center thereof. The outside wall 132a of the cylindrical portion 132 of the cylinder 13 and the inner wall of the cylinder housing chamber 151 are joined together so that the fuel pressurized in the pressurization chamber 14 does not leak from therebetween.

The upper housing 15 includes: a stepped first suction passage 161 penetrating the upper housing 15 in longitudinal direction thereof toward the opposite side to the pressurization chamber 14 with respect to the suction port 141; and multiple second suction passages 162 penetrating it from the first suction passage 161 toward the side wall of the upper housing 15. The fuel suction portion 70 is press-inserted and fixed in the first suction passage 161.

The upper housing 15 includes a stepped first discharge passage 163 penetrating the upper housing 15 in a longitudinal direction thereof toward the opposite side to the pressurization chamber 14 with respect to the discharge port 142. The fuel-discharge-relief-portion 90 is press inserted and fixed in the first discharge passage 163. The upper housing 15 corresponds to a "housing" of the present invention. The first discharge passage 163 corresponds to a "fuel passage" of the present invention.

The fuel supply portion 30 will be described hereinafter.

The fuel supply portion 30 includes a cover 31, a pulsation damper 33, and a fuel inlet 40.

Figure 2:
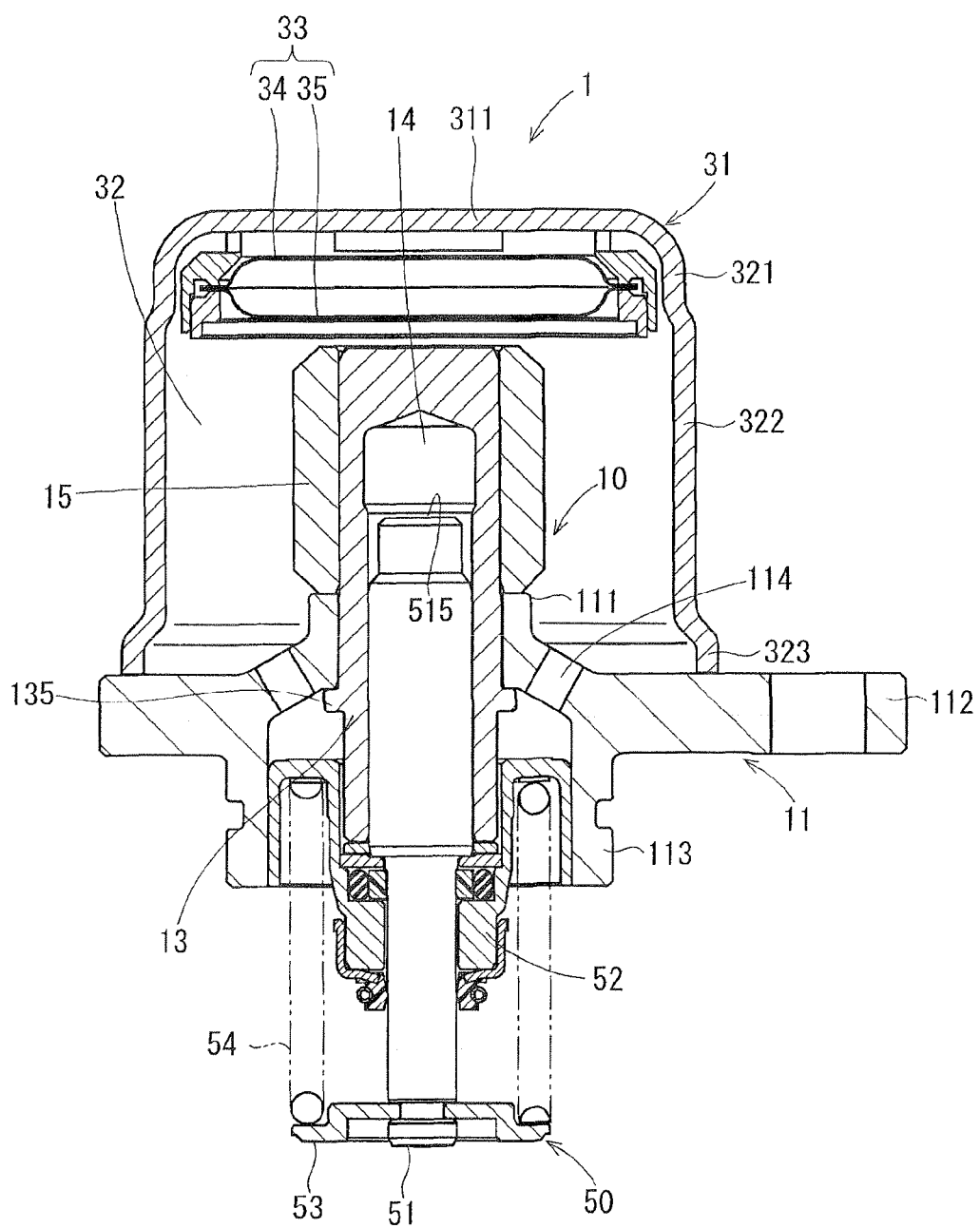
FIG. 2 is a sectional view taken along a line II-II of FIG. 1.
Figure 4:
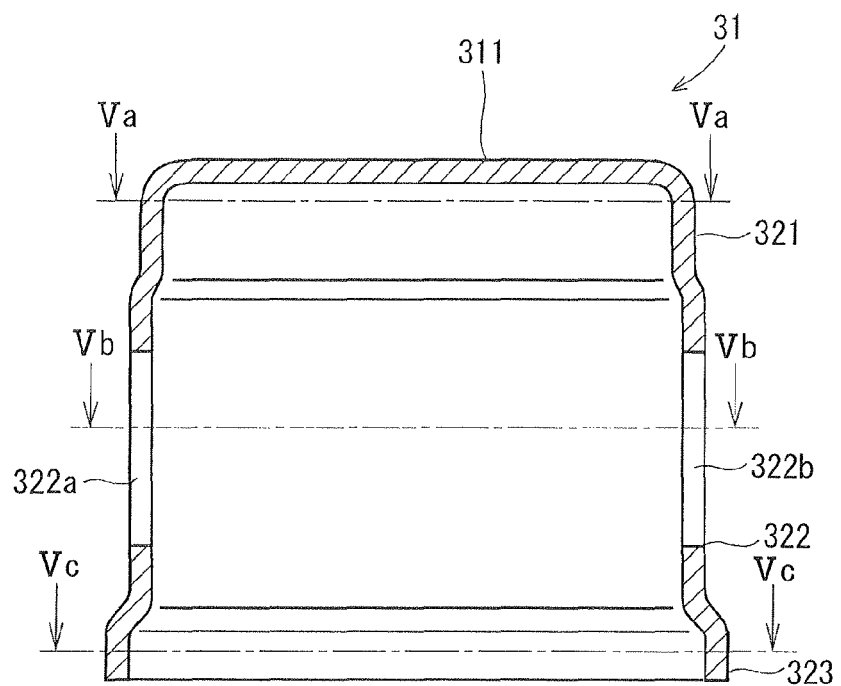
FIG. 4 is a sectional view of the cover of a high-pressure pump in the first embodiment of the invention.

As illustrated in FIG. 2, the cover 31 is cup-shaped and accommodates the upper housing 15 therein. As illustrated in FIG. 4, the side wall of the cover 31 includes: a first side wall portion 321 connected with the peripheral edge of the bottom portion 311; a third side wall portion 323 forming the side wall on the engine-mounting-portion 112; and a second side wall portion 322 connecting the first side wall portion 321 and the third side wall portion 323.

Figure 5A:
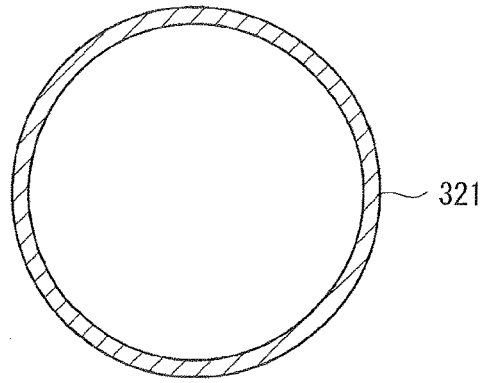
FIG. 5A is a sectional view of the cover of the high-pressure pump taken along a line Va-Va of FIG. 4.
Figure 5B:
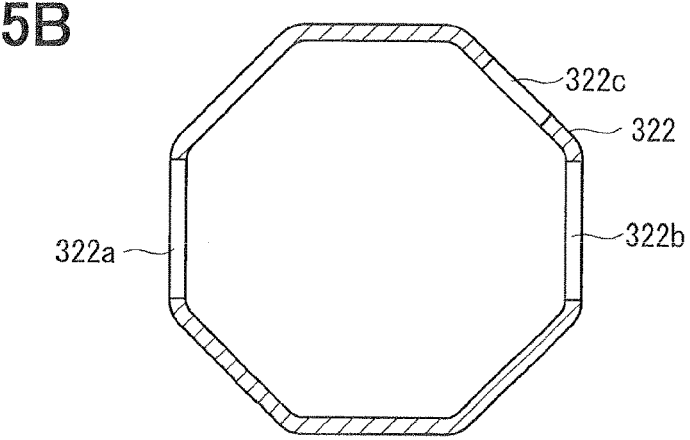
FIG. 5B is a sectional view of the cover of the high-pressure pump taken along a line Vb-Vb of FIG. 4.
Figure 5C:
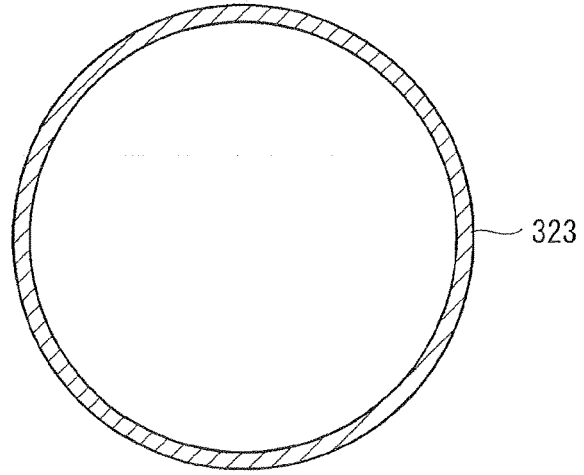
FIG. 5C is a sectional view of the cover of the high-pressure pump taken along a line Vc-Vc of FIG. 4.

FIGS. 5A to 5C respectively illustrate the cross sections of the cover 31 along an axis of the cylinder 13. The first side wall portion 321 (FIG. 5A) and the third side wall portion 323 (FIG. 5C) are substantially circular and the third side wall portion 323 is larger in inside diameter than the first side wall portion 321. As illustrated in FIG. 5B, the second side wall portion 322 is substantially octangular. The second side wall portion 322 includes a first through hole 322a. The fuel suction portion 70 is inserted into the first through hole 322a. The second side wall portion 322 includes a second through hole 322b located on the opposite side to the first through hole 322a. The fuel discharge relief portion 90 is inserted into the second through hole 322b. In the second side wall portion 322, a third through hole 322c is formed in the second side wall portion 322. The third through hole 322c is provided with the fuel inlet 40 for supplying fuel to a fuel gallery 32 formed in the cover 31.

The cover 31 is joined to the engine-mounting-portion 112 by welding so that the gap between the end of the third side wall portion 323 and the engine-mounting-portion 112 is liquid-tightly sealed. The cover 31 is joined to an inlet valve body 72 and a fuel discharge relief housing 91 by welding so that the following are liquid-tightly sealed: the gap between the first through hole 322a and the fuel suction portion 70 inserted therein and the gap between the second through hole 322b and the fuel discharge relief portion 90 inserted therein.

As illustrated in FIG. 2 and FIG. 3, the fuel gallery 32 is formed by the inner wall of the cover 31, the upper wall of the engine-mounting-portion 112 and the outer wall of the upper housing 15. The fuel gallery 32 communicates with the first suction passage 161 through the second suction passages 162. As a result, the fuel gallery 32 can be connected with the pressurization chamber 14 through the second suction passages 162 and the first suction passage 161. The pulsation damper 33 for reducing pulsation in the fuel pressure in the fuel gallery 32 is accommodated and fixed inside the bottom portion 311 of the cover 31. The cover 31 functions as a housing member for the pulsation damper 33.

Figure 6:
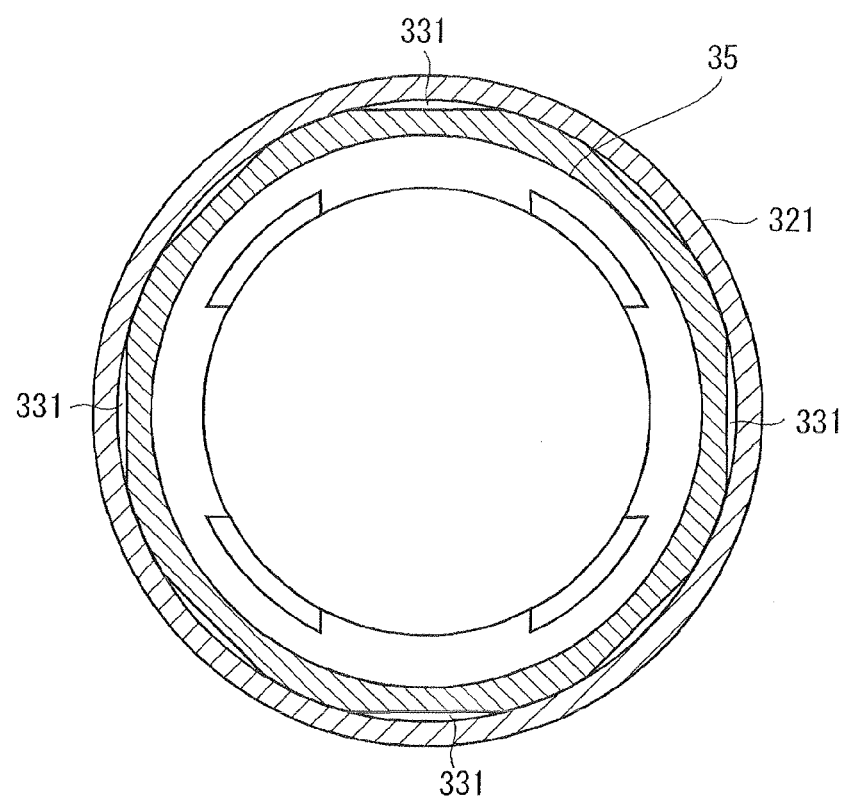
FIG. 6 is a sectional view taken along line VI-VI of FIG. 1.

The pulsation damper 33 is configured by joining together the peripheral edge portions of two diaphragms 34, 35. Gas at a predetermined pressure is sealed therein. When the two diaphragms 34, 35 are elastically deformed according to change in the fuel pressure in the fuel gallery 32, the pulsation damper 33 thereby reduces fuel pressure pulsation. As illustrated in FIG. 6, fuel passages 331 are formed between the pulsation damper 33 and the cover 31. The fuel flows into around the pulsation damper 33 through the fuel passages 331.

The plunger portion 50 will be described hereinafter.

The plunger portion 50 includes a plunger 51, an oil seal holder 52, a spring seat 53, a plunger spring 54, and the like. The plunger 51 is placed in the cylinder 13 to form the pressurization chamber 14. The plunger 51 is a solid cylindrical member which is reciprocatively moved in the cylinder 13 in the axial direction. In the plunger 51, a large-diameter portion 511 relatively large in outside diameter and a small-diameter portion 512 relatively small in outside diameter are integrally formed. The large-diameter portion 511 formed in the pressurization chamber 14 slides on the inner wall of the cylinder 13. The small-diameter portion 512 is inserted into the oil seal holder 52.

The oil seal holder 52 is placed at an end of the cylinder 13 and includes: a base portion 521 positioned on the circumference of the small-diameter portion 512 of the plunger 51; and a press-fit portion 522 press-inserted into the fitting portion 113 of the lower housing 11.

The base portion 521 has a ring-shaped seal 523 therein. The seal 523 is comprised of a ring 523a located inside and an O-ring 523b located outside. The thickness of a fuel oil film around the small-diameter portion 512 of the plunger 51 is adjusted by the seal 523 and the leakage of fuel to the engine is suppressed.

The base portion 521 has an oil seal 525 at a tip thereof. The thickness of an oil film around the small-diameter portion 512 of the plunger 51 is controlled by the oil seal 525 and oil leakage is suppressed. The press-fit portion 522 is a portion cylindrically extending around the base portion 521. The extending cylindrical portion has "U-shaped". A recessed portion 526 corresponding to the press-fit portion 522 is formed in the lower housing 11. The oil seal holder 52 is press fit so that the press-fit portion 522 is press-inserted to the inner wall of the recessed portion 526.

The spring seat 53 is provided at an end of the plunger 51. The end of the plunger 51 is abutted against, for example, a tappet (not shown). The tappet has its outer surface abutted against a cam installed on a cam shaft and is reciprocatively moved in the axial direction according to the cam profile by the rotation of the cam shaft.

One end of the plunger spring 54 is engaged with the spring seat 53 and the other end thereof is engaged with the press-fit portion 522 of the oil seal holder 52. As a result, the plunger spring 54 functions as a return spring for the plunger 51 and biases the plunger 51 so as to abut against the tappet.

With this configuration, the plunger 51 is reciprocatively moved according to the rotation of the cam shaft. As this time, the volumetric capacity of the pressurization chamber 14 is varied by the movement of the large-diameter portion 511 of the plunger 51.

The fuel suction portion 70 will be described hereinafter.

The fuel suction portion 70 includes an inlet valve portion 71 and an electromagnetic driving unit 81. The inlet valve portion 71 includes the inlet valve body 72, a seat body 73, an inlet valve member 74, a first spring holder 75, a first spring 76, and the like. The inlet valve body 72 is joined to the upper housing 15 by, for example, press fitting in the first suction passage 161. The inlet valve body 72 has a suction chamber 711 therein. The suction chamber 711 communicates with the fuel gallery 32 by way of a suction passage 712 and the second suction passages 162. The cylindrical seat body 73 is placed in the suction chamber 711. A valve seat 731 that can be abutted against the inlet valve member 74 is formed on the seat body 73.

The inlet valve member 74 is placed close to the pressurization chamber 14 relative to the seat body 73. In the inlet valve member 74, the shank 741 of a needle 86 extending from the inlet valve member 74 is reciprocatively moved in the suction chamber 711. When unseated from the valve seat 731, the inlet valve member 74 fluidly connects the suction chamber 711 and the pressurization chamber 14.

When seated on the valve seat 731, the inlet valve member 74 fluidly disconnects the suction chamber 711 and the pressurization chamber 14.

The first spring holder 75 is fixed in the fuel suction portion 70. The first spring holder 75 restricts the movement of the inlet valve member 74 in the valve opening direction (rightward in FIG. 1). The first spring 76 is provided between the first spring holder 75 and the inlet valve member 74. The first spring 76 biases the inlet valve member 74 in the valve closing direction (leftward in FIG. 1).

The electromagnetic driving unit 81 includes a flange 82, a fixed core 83, a movable core 84, and the like. The flange 82 radially extends around the inlet valve body 72. A substantially cylindrical movable core chamber 85 is provided in the interior of the inlet valve body 72. The cylindrical movable core 84 is accommodated in the movable core chamber 85 so that it can be reciprocatively moved in the axial direction. The needle 86 is connected to the movable core 84. The needle 86 is supported by a second spring holder 852 fixed on the inner wall of the inlet valve body 72 so that it can be reciprocatively moved. One end of the needle 86 is fixed on the movable core 84 and its shank 741 can be abutted against the inlet valve member 74. The second spring holder 852 includes a second spring 851. One end of the second spring is abutted against the wall surface of the second spring holder 852 in the axial direction. The other end is abutted against the wall surface of the shank 741 on the opposite side to the pressurization chamber 14. The second spring 851 biases the movable core 84 and the needle 86 in the valve opening direction with a force larger than a force with which the first spring 76 biases the inlet valve member 74 in the valve closing direction.

The fixed core 83 is provided on the opposite side to the inlet valve member 74 with respect to the movable core 84 in the inward radial direction of a coil 87. A cylindrical member 88 formed of a nonmagnetic material is provided between the fixed core 83 and the inlet valve body 72. The cylindrical member 88 suppresses short-circuiting of magnetic flux between the fixed core 83 and the inlet valve body 73 and increases the amount of magnetic flux flowing through the magnetic gap between the movable core 84 and the fixed core 83.

A bobbin 871 formed of resin is provided around the fixed core 84. The coil 87 is wound on the bobbin 871. The coil 87 is covered with a cylindrical case 89 in the radial direction so as to form a magnetic circuit together with the flange 82, the inlet valve body 72, the movable core 84, and the fixed core 83. A connector 891 extends in the outward radial direction of the case 89. When the coil 87 is energized through the terminal 892 of the connector 891, the coil 87 generates a magnetic field.

When the coil 87 is not energized, the movable core 84 and the fixed core 83 are away from each other due to the elastic force of the second spring 851. As a result, the needle 86 integrated with the movable core 84 is moved toward the pressurization chamber 14 and the end face of the needle 86 presses the inlet valve member 74. The inlet valve member 74 is thereby opened.

When the coil 87 is energized, a magnetic flux is generated in the magnetic circuit formed of the inlet valve body 72, the fixed core 83, the movable core 84, the flange 82, and the case 89. As a result, the movable core 84 is magnetically attracted toward the fixed core 83 against the elastic force of the second spring 851. Consequently, the needle 86 relieves pressing force against the inlet valve member 74.

Figure 7A:
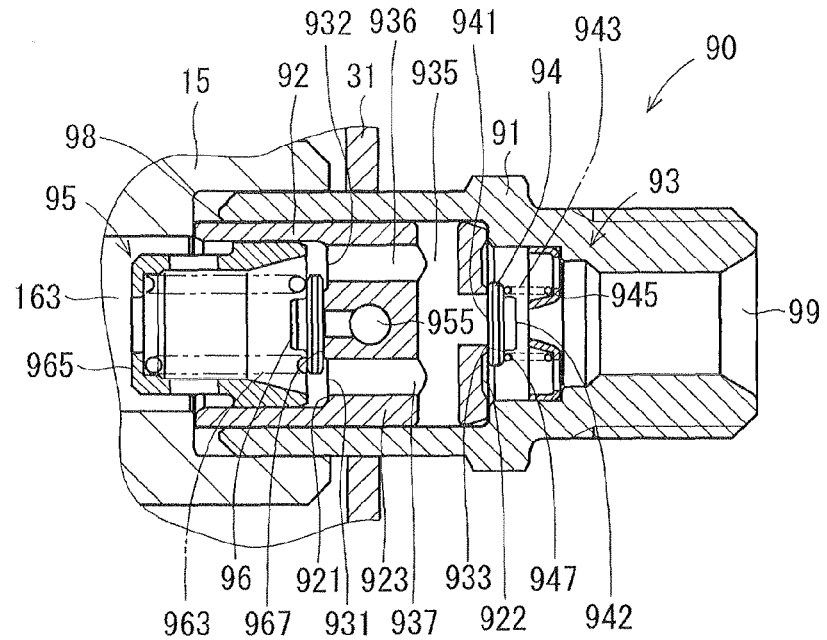
FIG. 7A is an enlarged sectional view of the fuel-discharge-relief-portion of the high-pressure pump indicated by line VIIa of FIG. 1.
Figure 7B:
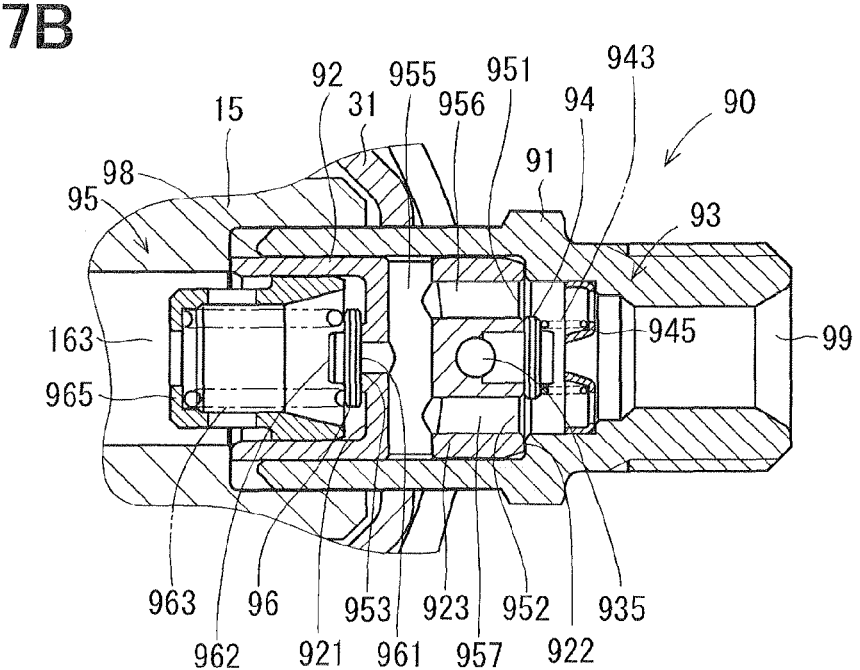
FIG. 7B is an enlarged sectional view of the fuel-discharge-relief-portion of the high-pressure pump indicated by line VIIb of FIG. 3.

With reference to FIGS. 7A and 7B, the fuel-discharge-relief-portion 90 will be described. FIG. 7A is an enlarged sectional view of the fuel-discharge-relief-portion 90 shown in FIG. 1. FIG. 7B is an enlarged sectional view of the fuel-discharge-relief-portion 90 shown in FIG. 3.

The fuel-discharge-relief-portion 90 includes a fuel-discharge-relief-housing 91, a valve body 92, a discharge valve 93, a relief valve 95, and the like. The fuel-discharge-relief-housing 91 is substantially cylindrical and accommodates the valve body 92, discharge valve 93, and relief valve 95 therein. The fuel-discharge-relief-housing 91 is press-inserted in the first discharge passage 163 formed in the upper housing 15. A fuel inflow port 98 into which the fuel pressurized in the pressurization chamber 14 flows is formed in the fuel-discharge-relief-housing 91. A fuel discharge port 99 is formed in the fuel-discharge-relief-housing 91.

The valve body 92 is inserted and installed in the fuel-discharge-relief-housing 91. The valve body 92 is substantially shaped as a closed-end cylinder and has a bottom portion 923 and an opening toward the pressurization chamber 14. In the bottom portion 923 of the valve body 92, a relief valve outlet 953 located on the central axis of the valve body 92 is formed in the end face 921. Further, discharge valve inlets 931, 932 are formed in equal positions in the circumferential direction around the central axis. In the bottom portion 923 of the valve body 92, a discharge valve outlet 933 located on the central axis of the valve body 92 is formed in the end face 922. Further, relief valve inlets 951, 952 are formed in equal positions in the circumferential direction around the central axis. The end face 921 corresponds to an "end face confronting the pressurization chamber." The end face 922 corresponds to "end face opposing to the pressurization chamber".

The discharge valve inlets 931, 932 and the discharge valve outlet 933 communicate with each other through a first discharge valve passage 935 and second discharge valve passages 936, 937 formed in the bottom portion 923 of the valve body 92. The first discharge valve passage 935 is formed in the direction substantially perpendicular to the central axis of the valve body 92. The second discharge valve passages 936, 937 are formed in the directions substantially parallel with the central axis of the valve body 92. The first discharge valve passage 935 and the second discharge valve passages 936, 937 are formed by drilling. The first discharge valve passage 935 and the second discharge valve passages 936, 937 correspond to "discharge valve passages"

The relief valve outlet 953 and the relief valve inlets 951, 952 communicate with each other through a first relief valve passage 955 and second relief valve passages 956, 957 formed in the bottom portion 923 of the valve body 92. The first relief valve passage 955 is formed in the direction substantially perpendicular to the central axis of the valve body 92. The second relief valve passages 956, 957 are formed in the directions substantially parallel with the central axis of the valve body 92. The first relief valve passage 955 and the second relief valve passages 956, 957 are formed by drilling. The first discharge valve passage 935 is located between the first relief valve passage 955 and the fuel discharge port 99. The first discharge valve passage 935 and the first relief valve passage 955 are shifted in the direction of the circumference of the valve body 92 and formed in skew positions relative to each other. The first relief valve passage 955 and the second relief valve passages 956, 957 correspond to "relief valve passages".

In the fuel-discharge-relief-housing 91, the discharge valve 93 is disposed adjacent to the fuel discharge port 99.

The discharge valve 93 includes a discharge valve member 94, a discharge valve spring 943, and a discharge valve spring holder 945.

The discharge valve member 94 is substantially a flat plate. The discharge valve member 94 is arranged in such a manner as to be in contact with the end face 922 of the valve body 92 where the discharge valve outlet 933 is formed. That is, the discharge valve outlet 933 functions as a discharge valve seat 947 for the discharge valve member 94. One end of the discharge valve spring 943 is engaged with the discharge valve member 94. The other end of the discharge valve spring 943 is engaged with the discharge valve spring holder 945 which is in contact with the inner wall of the fuel-discharge-relief-housing 91. The discharge valve spring 943 has biasing force that biases the discharge valve member 94 in a direction from the fuel discharge port 99 to the pressurization chamber 14. That is, the discharge valve spring 943 biases the discharge valve member 94 in a direction in which the discharge valve outlet 933 is closed. The discharge valve spring holder 945 is in the shape of a circular tube having "U"-shaped sections. Multiple openings are formed in the discharge valve spring holder 945 so that the following flow of fuel is not blocked: the flow of fuel from the pressurization chamber 14 to the fuel discharge port 99 or from the fuel discharge port 99 to the pressurization chamber 14.

A first pressure force is exerted on the plane 941 of the discharge valve member 94. The pressure force of fuel in the fuel discharge port 99 exerts on the plane 942 of the discharge valve member 94. A discharge valve acting force is the resultant force of this force and the biasing force of the discharge valve spring 943. When the first pressure force is less than or equal to the discharge valve acting force, in the discharge valve 93, the discharge valve member 94 is seated on the discharge valve seat 947 and the valve is closed. When the first pressure force is greater than the discharge valve acting force, the discharge valve member 94 is unseated from the discharge valve seat 947 and the valve is opened. As a result, the fuel that flowed from the pressurization chamber 14 into the fuel-discharge-relief-portion 90 is discharged from the fuel discharge port 99 by way of the second discharge valve passages 936, 937 and the first discharge valve passage 935.

The relief valve 95 is arranged in the valve body 92. The relief valve 95 includes a flat relief valve member 96, a relief valve spring 963, and a relief valve spring holder 965.

The relief valve member 96 is arranged in such a manner as to be in contact with the end face 921 of the valve body 92 forming the relief valve outlet 953. That is, the relief valve outlet 953 functions as a relief valve seat 967 for the relief valve member 96. One end of the relief valve spring 963 is engaged with the relief valve member 96. The other end of the relief valve spring 963 is engaged with the relief valve spring holder 965. The relief valve spring 963 has a biasing force that biases the relief valve member 96 in a direction from the pressurization chamber 14 to the fuel discharge port 99. That is, the relief valve spring 963 biases the relief valve member 96 in a direction in which the relief valve outlet 953 is closed. In the bottom portion and cylindrical portion of the relief valve spring holder 965, multiple openings are formed. Through these openings, the fuel flows between the pressurization chamber 14 and the fuel discharge port 99. The biasing force of the relief valve spring 963 is set larger than the biasing force of the discharge valve spring 943. The relief valve member 96 is arranged in series with the discharge valve member 94 in a direction of the axis of the valve body 91.

A third pressure force is exerted on the plane 961 of the relief valve member 96. The pressure of fuel in the pressurization chamber 14 exerts on the plane 962 of the relief valve member 96. A relief valve acting force is a resultant force of this force and the biasing force of the relief valve spring 963. When the third pressure force is less than or equal to the relief valve acting force, the relief valve member 96 is seated on the relief valve seat 967 and the valve is closed. When the third pressure force is greater than the relief valve acting force, the relief valve member 96 is unseated from the relief valve seat 967 and the valve is opened. As a result, the fuel that flowed from the fuel discharge port 99 into the fuel-discharge-relief-portion 90 is returned to the pressurization chamber 14 by way of the second relief valve passages 956, 957 and the first relief valve passage 955.

[Operation]

An operation of the high-pressure pump 1 will be described hereinafter.

(I) Suction Stroke

When the plunger 51 is moved down from the top dead center to the bottom dead center by rotation of the cam shaft, the volumetric capacity of the pressurization chamber 14 is increased and the fuel is depressurized. The discharge valve member 94 of the discharge valve 93 is seated on the discharge valve seat 947 and closes the fuel discharge port 99. At this time, since the coil 87 has not been energized, the movable core 85 and the needle 86 are moved toward the pressurization chamber 14 by the biasing force of the second spring 85. The needle 86 biases the inlet valve member 74 toward the first spring holder 75 to maintain the valve closed state. The fuel is suctioned from the fuel gallery 32 into the pressurization chamber 14 by way of the second suction passage 162, the suction passage 712, the suction chamber 711, the first suction passage 161, and the suction port 141.

(II) Metering Stroke

When the plunger 51 is moved up from the bottom dead center to the top dead center by rotation of the cam shaft, the volumetric capacity of the pressurization chamber 14 is reduced. The energization of the coil 87 is stopped until a predetermined time. The inlet valve member 74 is in the open state. Thus, the low-pressure fuel once suctioned into the pressurization chamber 14 is returned to the suction chamber 711 by way of the suction port 141 and the first suction passage 161.

When the energization of the coil 87 is started at the predetermined time in the process of the plunger 51 ascending, a magnetic attractive force is generated between the fixed core 83 and the movable core 84. When this magnetic attractive force becomes larger than the biasing force of the second spring 851, the movable core 84 and the needle 86 are moved toward the fixed core 83 and the biasing force of the needle 86 against the inlet valve member 74 is canceled.

Then, the inlet valve member 74 moves away from the first spring holder 75 by the biasing force of the first spring 76 and the inlet valve member 74 moves toward the suction chamber 711. As a result, the inlet valve member 74 is seated on the valve seat 731 formed in the seat body 73.

(III) Pressurization Stroke

After the inlet valve member 74 is closed, the fuel pressure in the pressurization chamber 14 is increased with ascent of the plunger 51. When the force exerted on the plane 941 of the discharge valve member 94 by the pressure of fuel in the pressurization chamber 14 becomes larger than the following resultant force, the discharge valve 93 is opened. The resultant force exerted on the plane 942 is a resultant of the pressure force of fuel in the fuel discharge port 99 and the biasing force of the discharge valve spring 943. The pressurized fuel pressurized in the pressurization chamber 14 is discharged from the fuel discharge port 99. The energization of the coil 87 is stopped in the pressurization stroke. Since the force exerted on the inlet valve member 74 by the fuel pressure in the pressurization chamber 14 is larger than the energizing force of the second spring 851, the inlet valve member 74 maintains the valve closed state.

As mentioned above, the high-pressure pump 1 repeats the suction stroke, metering stroke, and pressurization stroke. The suctioned fuel is pressurized and discharged into the fuel accumulator through the fuel discharge port 99. The fuel accumulator accumulates the discharged fuel. The fuel accumulated in the fuel accumulator is injected through a fuel injector (not shown).

When the pressure of the fuel in the fuel accumulator is less than or equal to a predetermined value, the relief valve member 96 is seated on the relief valve seat 967 by the biasing force of the relief valve spring 963. Therefore, the relief valve 95 is closed. However, the fuel pressure in the fuel accumulator may be increased due to a malfunction. When the force exerted on the plane 961 of the relief valve member 96 by the pressure of fuel in the fuel accumulator exceeds a specified value, the relief valve member 96 is moved toward the pressurization chamber 14 and the relief valve 95 is closed. The specified value corresponds to the sum of the force exerted on the plane 962 of the relief valve member 96 by the pressure of fuel in the pressurization chamber 14 and the biasing force of the relief valve spring 963. As a result, the flow of fuel from the fuel discharge port 99 to the pressurization chamber 14 is permitted.

[Advantages]

Advantages of the above high-pressure pump 1 will be described hereinafter.

(I) The discharge valve 93 and the relief valve 95 are accommodated in one valve housing 91. The valve members of the two valves are formed coaxially with the valve body 92 and arranged in series. This makes it possible to simplify the configuration of the discharge relief portion 90.

(II) The discharge valve 93 and the relief valve 951 are formed by machining the valve body 92 in the discharge relief housing 91. Therefore, it is possible to simplify the configurations of the discharge valve 93 and the relief valve 95, whereby the physical size of the discharge relief portion 90 can be reduced. Also, its manufacturing cost can be reduced.

(III) Since the discharge valve 93 and the relief valve 95 are accommodated in the discharge relief housing 91 that forms one passage, it is possible to reduce the dead volume that does not contribute to pressurization of fuel. Therefore, the discharging efficiency of the high-pressure pump 1 can be enhanced.

(IV) The valve body 92 defines passages for the discharge valve 93 and the relief valve 95. As a result, the discharge relief portion 90 of the high-pressure pump 1 configures a "sub-assembly" which is comprised of the valve body 92 connected with the discharge valve 93 and the relief valve 95 and the discharge relief housing 91 in which the valve body 92 is accommodated. With this configuration, the effects (i) to (iii) described below are obtained when the high-pressure pump 1 is manufactured.

(i) Since the discharge relief valve unit can be produced in a sub-assembly line different from the main assembly line for the high-pressure pump 1, a tact time can be shortened.

(ii) When inspecting and adjusting the valve opening pressure of the relief valve 95, the discharge relief housing 91 only has to be set on an inspection equipment. The inspection equipment can be reduced in size and simplified.

(iii) When the relief valve opening pressure is not within the predetermined range due to an inspecting equipment, it is inevitable to discard the work piece as a defective. For this reason, with the configuration in which the valve opening pressure of the relief valve 95 is adjusted as for the entire housing, any defective must be discarded together with the housing. Meanwhile, when the discharge relief portion 91 is configured as a sub-assembly, any defective discharge relief portion only has to be discarded and the loss cost arising from discard can be significantly reduced.

(V) The discharge valve inlets 931, 932 formed in the valve body 92 are arranged at equal intervals in the circumferential direction about a central axis of the valve body 92. As a result, the fuel flowing in the first discharge valve passage 935 and the second discharge valve passages 936, 937 can flow without being biased to a specific direction. Therefore, it is possible to prevent degradation in discharging efficiency caused by an inclined discharge valve member 94.

The relief valve inlets 951, 952 formed in the valve body 92 are arranged at equal intervals in the circumferential direction around the central axis of the valve body 92. As a result, the fuel flowing in the first relief valve passage 955 and the second relief valve passages 956, 957 can flow without being biased to a specific direction. Therefore, it is possible to prevent degradation in relief efficiency caused by an inclined relief valve member.

(VI) The discharge valve member 94 and the relief valve member 96 are in a flat shape. The discharge valve seat 947 and the relief valve seat 967 are also flat. This makes it possible to reduce the number of steps for grinding and/or polishing the discharge valve 93 and the relief valve 95. Its manufacturing cost can be reduced.

(VII) The relief valve spring holder 965 that supports the relief valve spring 963 is press-inserted into the valve body 92. By adjusting the press-insert depth, the length of the relief valve spring 963 disposed between the relief valve spring holder 965 and the relief valve member 96 can be suitably adjusted. Thus, the biasing force of the relief valve spring 963 and the valve opening pressure of the relief valve 95 can be adjusted.

Second Embodiment

Figure 8:
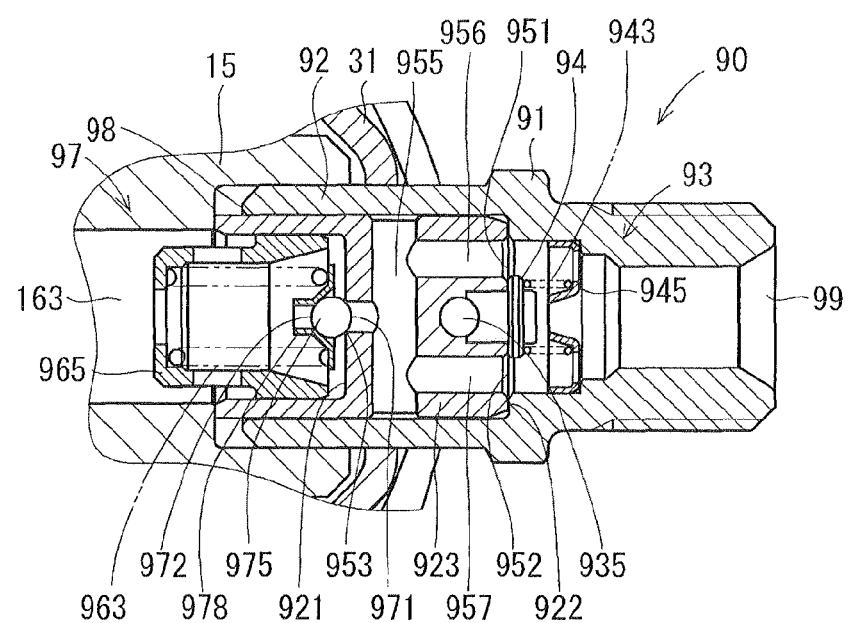
FIG. 8 is a sectional view of the fuel-discharge-relief-portion of a high-pressure pump in a second embodiment of the invention.

Referring to FIG. 8, a second embodiment will be described hereinafter. The second embodiment is different from the first embodiment in the shape of the valve body of a relief valve. The substantially same parts and the components as the first embodiment are indicated with the same reference numeral and the same description will not be reiterated.

The relief valve member 975 of the relief valve 97 is substantially in a spherical shape. The relief valve member 975 is supported by a substantially conical valve seat 978 arranged at one end of the relief valve spring 963.

A fifth pressure force is exerted on the plane 971 of the relief valve member 975 by the pressure of fuel in the fuel discharge port 99. The pressure of fuel in the pressurization chamber 14 exerts on the plane 972 of the relief valve member 975. A relief valve acting force is the resultant force of this force and the biasing force of the relief valve spring 963. When the fifth pressure force is smaller than or equal to the relief valve acting force, the relief valve member 975 is seated on the relief valve seat 967 and the valve is closed. Meanwhile, when the fifth pressure force is greater than the relief valve acting force, the relief valve member 975 is unseated from the relief valve seat 967 and the valve is opened. As a result, the fuel that flowed from the fuel discharge port 99 into the fuel-discharge-relief-portion 90 is returned to the pressurization chamber 14 by way of the second relief valve passages 956, 957 and the first relief valve passage 955.

Third Embodiment

Figure 9:
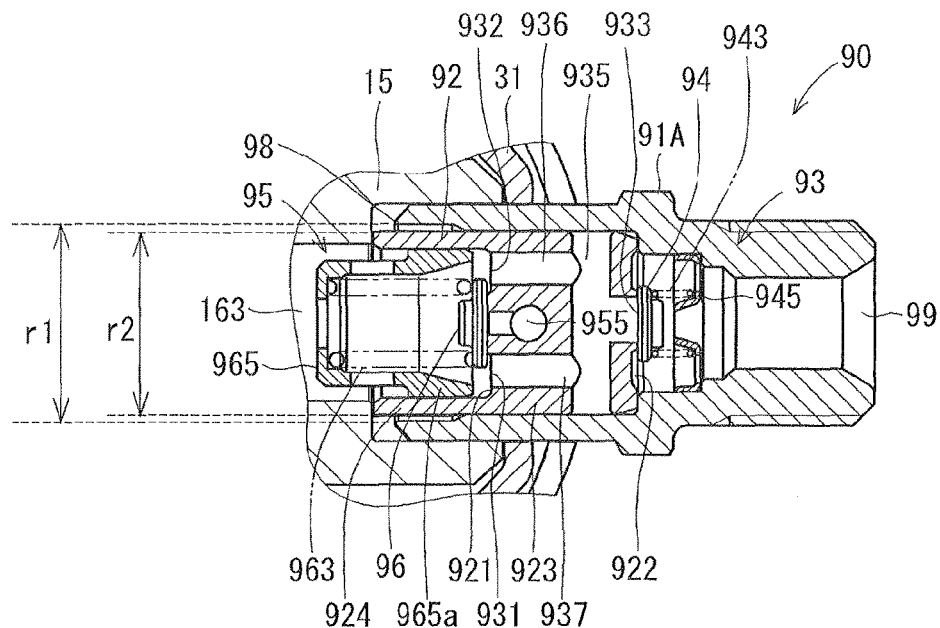
FIG. 9 is a sectional view of the fuel-discharge-relief-portion of a high-pressure pump in a third embodiment of the invention.

Referring to FIG. 9, a third embodiment will be described hereinafter. The third embodiment is partly different from the first embodiment in the shape of the fuel-discharge-relief-housing. The substantially same parts and the components as the first embodiment are indicated with the same reference numeral and the same description will not be reiterated.

In the third embodiment, the following diameters of the inside diameter of a fuel-discharge-relief-housing 91A are different from each other. That is, the inside diameter r1 through which the relief valve spring holder 965 is inserted in the valve body 92; and the inside diameter r2 in which the bottom portion 923 of the valve body 92 is fixed. More specifically, as illustrated in FIG. 9, the inside diameter r1 is larger than the inside diameter r2. At the inside diameter r1 of the fuel-discharge-relief-housing 91A, the press-fit portion 965a of the relief valve spring holder 965 is opposed to the outer wall of the valve body cylindrical portion 924 abutted against the valve body 92. At the inside diameter r2, the bottom portion 923 of the valve body 92 is fixed.

When the relief valve spring housing 965 is press fit and fixed in the valve body 92, the press-fit portion 965a of the relief valve spring housing 965 pushes and widens the valve body cylindrical portion 924 in a radially outward direction. When the dimensions of the fuel-discharge-relief-housing 91A supporting the valve body 92 are varied, it is likely that the fuel-discharge-relief-housing 91A can not be press-inserted into the upper housing 15. According to the present embodiment, the inside diameter of the fuel-discharge-relief-housing 91A is increased. This inside diameter of the fuel-discharge-relief-housing 91A is opposed to the outer wall of the valve body cylindrical portion 924 against which the press-fit portion 965a is abutted. This makes it possible to prevent variation in the dimensions of the fuel-discharge-relief-housing 91A caused by widening of the valve body cylindrical portion 924 in the radially outward direction.

Fourth Embodiment

Figure 10:
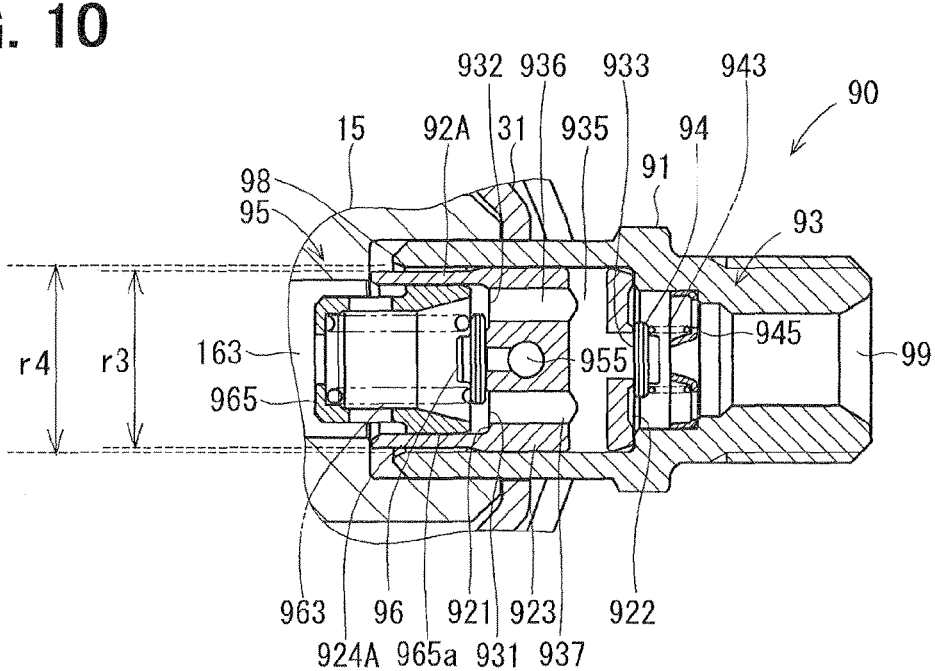
FIG. 10 is a sectional view of the fuel-discharge-relief-portion of a high-pressure pump in a fourth embodiment of the invention.

Referring to FIG. 10, a fourth embodiment will be described hereinafter. The fourth embodiment is partly different from the first embodiment in the shape of a valve body. The substantially same parts and the components as the first embodiment are indicated with the same reference numeral and the same description will not be reiterated.

In the fourth embodiment, as illustrated in FIG. 10, a valve body 92A is so formed that the outside diameter r3 of the valve body cylindrical portion 924A is smaller than the outside diameter r4 of the bottom portion 923 of the valve body 92A.

When the relief valve spring housing 965 is press fit and fixed in the valve body 92A, the press-fit portion 965a of the relief valve spring housing 965 pushes and widens the valve body cylindrical portion 924A in a radially outward direction. When the dimensions of the fuel-discharge-relief-housing 91 supporting the valve body 92A are varied, it is likely that the fuel-discharge-relief-housing 91 can not be press-inserted into the upper housing 15. According to the present embodiment, the outside diameter r3 of the valve body cylindrical portion 924 of the valve body 92A is smaller than the outside diameter r4 of the bottom portion 923 of the valve body 92A. This makes it possible to prevent variation in the dimensions of the fuel-discharge-relief-housing 91A caused by widening of the valve body cylindrical portion 924 in the radially outward direction.

[Modifications]

In the above first embodiment, third embodiment, and fourth embodiment, each relief valve member is formed in a flat shape. In the above-mentioned second embodiment, the relief valve member is formed in a spherical shape. However, the shape of the relief valve member is not limited to those. It may be conical. The shape of each discharge valve member is not limited to flat and may be spherical or conical.

In the above-mentioned embodiments, two fuel passages are formed in the lower housing. However, the number of fuel passages is not limited to this and may be one or more than two.

Fifth Embodiment

FIGS. 11 to 14B illustrate a high-pressure pump according to a fifth embodiment. The high-pressure pump 2001 is a fuel pump that supplies fuel to an internal combustion engine at high pressure. The fuel supplied to the engine by the high-pressure pump 2001 is, for example, gasoline. The high-pressure pump 2001 suctions the fuel from the fuel tank and discharges the fuel to the delivery pipe (not shown).

The high-pressure pump 2001 includes a plunger 2020, a cylinder 2030, a housing 2040, a cylindrical member 2050, a valve body 2060, a discharge valve member 2071, a relief valve member 2072, a discharge valve biasing portion 2080, a relief valve biasing portion 2090, and the like.

The plunger 2020 is formed as a solid cylinder of metal, such as stainless steel. The plunger 2020 is comprised of a large-diameter portion 2021, a small-diameter portion 2022, and a protruded portion 2023. The small-diameter portion 2022 extends from one end of the large-diameter portion 2021 in the axial direction and its outside diameter is smaller than the outside diameter of the large-diameter portion 2021. The protruded portion 2023 is so formed that it is protruded from the center of the other end of the large-diameter portion 2021 to the opposite side to the small-diameter portion 2022. Its outside diameter is smaller than the outside diameter of the large-diameter portion 2021.

The cylinder 2030 is formed as a closed-end cylinder of metal, such as stainless steel. The plunger 2020 is inserted to inside the cylinder 2030 from the protruded portion 2023. The cylinder 2030 has a pressurization chamber 2031 formed of its inner wall and the outer wall of the protruded portion 2023 of the plunger 2020.

The inner wall of the cylinder 2030 and the outer wall of the large-diameter portion 2021 of the plunger 2020 can be slid on each other. That is, the cylinder 2030 houses the plunger 2020 so that it can be reciprocatively moved in the axial direction. The inside of the cylinder 2030 corresponds to a "plunger housing hole". When the plunger 2020 is reciprocatively moved inside the cylinder 2030, the volumetric capacity of the pressurization chamber 2031 is varied. The hardness of the cylinder 2030 is enhanced by heat treatment, such as quenching, in order to suppress seizure and wear due to sliding of the plunger 2020.

The cylinder 2030 includes a suction port 2032 and a discharge port 2033 that allow the outside in the radial direction and the pressurization chamber 2031 to communicate with each other. The suction port 2032 and the discharge port 2033 are formed on a virtual straight line orthogonal to the axis of the cylinder 2030. That is, the suction port 2032 is formed on the opposite side to the discharge port 2033. The cylinder 2030 has an annular protrusion 2034 protruded from its outer wall in the radially outward direction.

The housing 2040 is made from stainless steel. The housing 2040 is comprised of an upper housing 2041 and a lower housing 2046.

Figure 11:
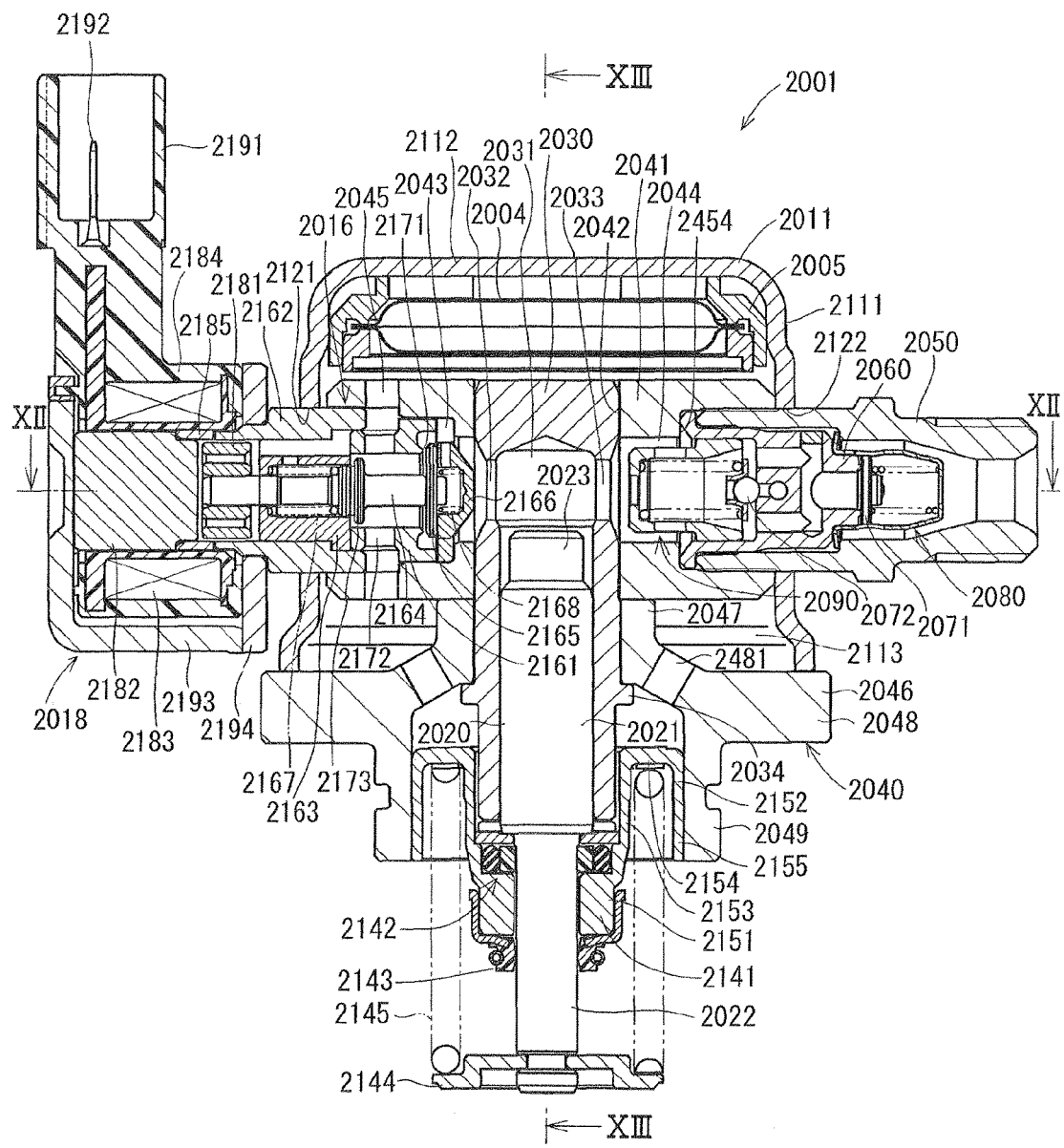
FIG. 11 is a sectional view illustrating a high-pressure pump in a fifth embodiment of the invention.
Figure 12:
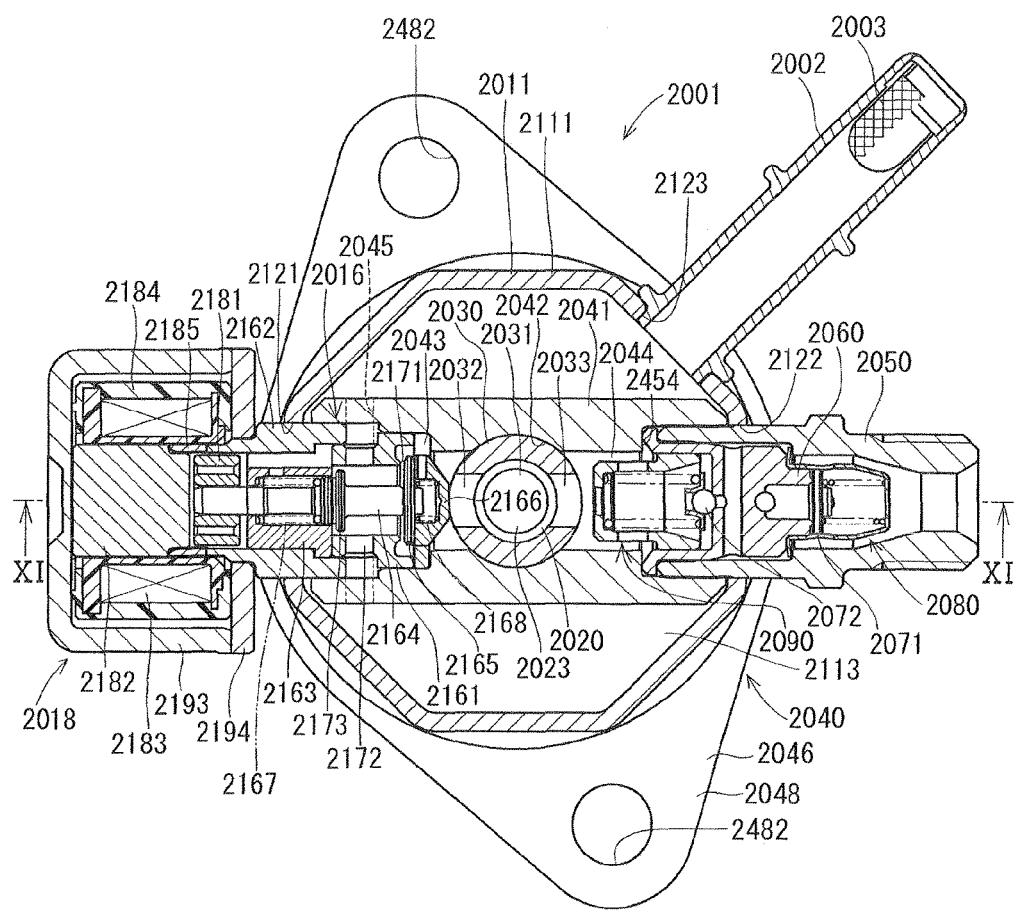
FIG. 12 is a sectional view taken along a line XII-XII of FIG. 11.
Figure 13:
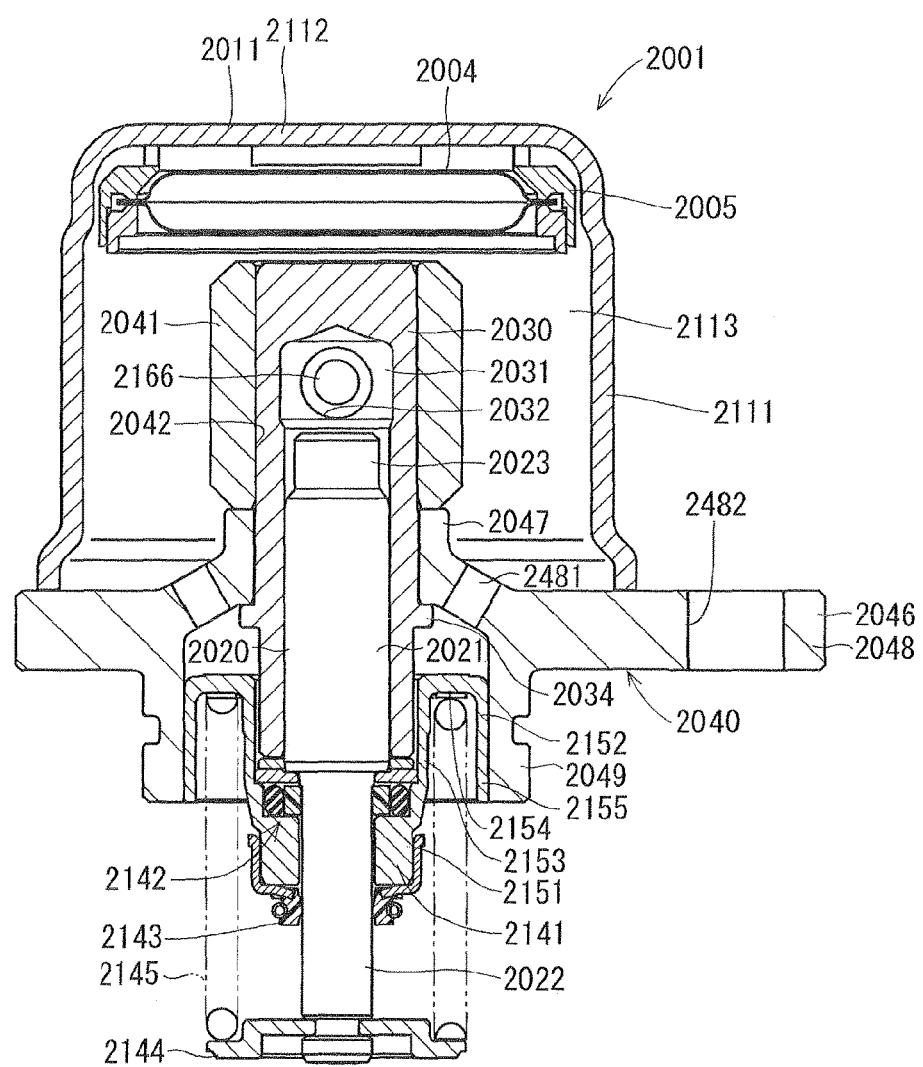
FIG. 13 is a sectional view taken along a line XIII-XIII of FIG. 11.

As illustrated in FIGS. 11 and 12, the upper housing 2041 is formed substantially in the shape of a rectangular parallelepiped. The upper housing 2041 has a housing hole 2042 in its longitudinal direction. In addition, the upper housing 2041 includes a suction passage 2043 and a discharge passage 2044 that connect together the outer wall surface and the inner wall surface forming the housing hole 2042. The discharge passage 2044 is comprised of a first discharge passage 2441 communicating with the housing hole 2042 and a second discharge passage 2442 communicating with the first discharge passage 2441.

The upper housing 2041 includes: a cylindrical first inner wall surface 2451 forming the first discharge passage 2441; and a cylindrical second inner wall surface 2452 forming the second discharge passage 2442. The second inner wall surface 2452 is larger in diameter than the first inner wall surface 2451. An inside thread groove 2453 is formed in the second inner wall surface 2452. The upper housing 2041 includes an annular stepped surface 2454 formed between the first inner wall surface 2451 and the second inner wall surface 2452. The stepped surface 2454 corresponds to a "stepped surface". The upper housing 2041 includes multiple through holes 2045 that connect together the outer wall surface and the inner wall surface forming the suction passage 2043.

The lower housing 2046 is comprised of a cylinder-holding-portion 2047, a plate portion 2048, and a cylindrical portion 2049. The cylinder-holding-portion 2047 is formed in the shape of a hollow cylinder. The plate portion 2048 is formed in such a manner as to extend from one end of the cylinder-holding-portion 2047 in the radially outward direction. The cylindrical portion 2049 is formed in such a manner as to substantially cylindrically extend from the plate portion 2048 to the opposite side relative to the cylinder-holding-portion 2047. Multiple through holes 2481 penetrating the plate portion 2048 in the direction of plate thickness are formed between the cylinder-holding-portion 2047 and the cylindrical portion 2049. As illustrated in FIG. 12, mounting holes 2482 into which fastening members for mounting the high-pressure pump 2001 on the engine are inserted are formed in the plate portion 2048.

The cylinder 2030 is press-inserted into the cylinder-holding-portion 2047 of the lower housing 2046 and the housing hole 2042 of the upper housing 2041. The suction passage 2043 of the upper housing 2041 communicates with the suction port 2032 of the cylinder 2030. The discharge passage 2044 of the upper housing 2041 communicates with the discharge port 2033 of the cylinder 2030.

The annular protrusion 2034 of the cylinder 2030 is abutted against the lower housing 2046. This restricts the movement of the cylinder 2030 relative to the lower housing 2046 and the upper housing 2041 in the axial direction. As mentioned above, the upper housing 2041 and the lower housing 2046 accommodate the cylinder 2030 so that the cylinder 2030 cannot make a relative movement.

In the present embodiment, a cover member 2011 is provided on the plate portion 2048 of the lower housing 2046. The cover member 2011 is formed in the shape of a cup. The cover member 2011 is comprised of a substantially octagonal cylindrical portion 2111 and a bottom portion 2112 closing one end of the cylindrical portion 2111. The cover member 2011 covers the upper housing 2041 and the cylinder-holding-portion 2047 of the lower housing 2046 so that they are positioned inside the cylindrical portion 2111. The end of the cylindrical portion 2111 is abutted against the plate portion 2048 of the lower housing 2046 and circumferentially welded thereto. Thus, it is liquid-tightly sealed between the cylindrical portion 2111 and the plate portion 2048 and a fuel gallery 2113 is formed inside the cover member 2011.

A hole 2121 is formed in the cylindrical portion 2111 in a position corresponding to the suction passage 2043. A hole 2122 is formed in the cylindrical portion 2111 in a position corresponding to the discharge passage 2044. As illustrated in FIG. 12, a fuel inlet 2002 is attached to the cylindrical portion 2111. The fuel inlet 2002 is formed in a cylindrical shape; and one end thereof is fit into a hole 2123 formed in the cylindrical portion 2111 and its circumference is welded to the cylindrical portion 2111. A fuel pipe connected to the fuel tank, not shown, is connected to the other end of the fuel inlet 2002. As a result, the fuel in the fuel tank is supplied to the fuel gallery 2113 by way of the fuel pipe and the fuel inlet 2002. A filter 2003 is provided inside the other end of the fuel inlet 2002.

A pulsation damper 2004 is provided between the bottom portion 2112 of the fuel gallery 2113 and the upper housing 2041. The pulsation damper 2004 is formed by joining together the peripheral edge portions of two diaphragms and gas at a predetermined pressure is tightly sealed therein. The pulsation damper 2004 is held by a holding member 2005 fixed at a vicinity of the bottom portion 2112. The pulsation damper 2004 is elastically deformed according to change in the fuel pressure in the fuel gallery 2113 and can thereby reduce fuel pressure pulsation.

An oil seal holder 2141 is provided at the end of the cylinder 2030. The oil seal holder 2141 is comprised of a cylindrical base portion 2151 into which the small-diameter portion 2022 is inserted and a press-fit portion 2152 press-inserted into the cylindrical portion 2049 of the lower housing 2046. The base portion 2151 and the press-fit portion 2152 are integrally formed. An annular seal 2142 is provided inside of the base portion 2151. The seal 2142 is comprised of a ring located inside in the radial direction and a ring made of rubber located outside in the radial direction. The thickness of a fuel oil film around the small-diameter portion 2022 of the plunger 2020 is adjusted by the seal 2142 and the leakage of fuel to the engine is suppressed. An oil seal 2143 is provided at the other end of the base portion 2151. The thickness of an oil film around the small-diameter portion 2022 of the plunger 2020 is adjusted by the oil seal 2143 and the leakage of oil is suppressed by the same.

The press-fit portion 2152 is comprised of: an inner cylindrical portion 2153 cylindrically extended from one end of the base portion 2151; a connecting portion 2154 annularly extended from the end of the inner cylindrical portion 2153 on the opposite side to the base portion 2151 in the outward radial direction; and an outer cylindrical portion 2155 cylindrically extended from the outer edge of the connecting portion 2154 toward the base portion 2151. As mentioned above, the press-fit portion 2152 is formed in a double cylindrical shape. The press-fit portion 2152 is press-inserted into the cylindrical portion 2049 so that the outer wall of the outer cylindrical portion 2155 is in contact with the inner wall of the cylindrical portion 2049 of the lower housing 2046.

A disk-shaped spring seat 2144 is provided at the end of the small-diameter portion 2022 of the plunger 2020. A spring 2145 is provided between the spring seat 2144 and the connecting portion 2154 of the press-fit portion 2152 of the oil seal holder 2141.

When the high-pressure pump 2001 is mounted on the engine, the end of the small-diameter portion 2022 of the plunger 2020 is abutted against a tappet (not shown) of the engine. The tappet has its outer surface abutted against a cam installed on a cam shaft, and is reciprocatively moved in the axial direction according to the cam profile by the rotation of the cam shaft. One end of the spring 2145 is engaged with the spring seat 2144 and the other end thereof is anchored to the connecting portion 2154. As a result, the spring 2145 functions as a return spring for the plunger 2020 and energizes the plunger 2020 so as to abut it against the tappet.

With the above configuration, the plunger 2020 is reciprocatively moved in the axial direction according to the rotation of the cam shaft. The volumetric capacity of the pressurization chamber 2031 is varied.

An inlet valve portion 2016 is provided in the suction passage 2043 of the upper housing 2041. The inlet valve portion 2016 includes: an inlet valve body 2161, a first cylindrical member 2162, a second cylindrical member 2163, a needle 2164, an inlet valve member 2165, a stopper 2166, a first spring 2167, a second spring 2168, and the like.

The inlet valve body 2161 is formed in a substantially cylindrical shape and is so provided that the outer wall of one end thereof is abutted against the inner wall of the upper housing 2041 forming the suction passage 2043. An annular inlet valve seat 2171 is formed on the end face of the inlet valve body 2161. The inlet valve body 2161 includes multiple through holes 2172 that connect its inner wall and its outer wall.

The first cylindrical member 2162 is made from magnetic material. The first cylindrical member 2162 is inserted into the hole 2121 in the cylindrical portion 2111 of the cover member 2011. Its outer wall is abutted against the inner wall of the upper housing 2041 forming the suction passage 2043. The other end of the inlet valve body 2161 is positioned inside of the first cylindrical member 2162.

The through holes 2045 in the upper housing 2041 and the through holes 2172 in the inlet valve body 2161 communicate with each other. As a result, the fuel gallery 2113 and the inside of the inlet valve body 2161 communicate with each other through the through holes 2045 and the through holes 2172. The outer wall of the first cylindrical member 2162 and the rim of the hole 2121 in the cover member 2011 are welded together throughout the circumference. The liquid tightness of the fuel gallery 2113 is thereby maintained.

The second cylindrical member 2163 is formed in the shape of a closed-end cylinder. Its outer wall is abutted against the inner wall of the first cylindrical member 2162. The needle 2164 is inserted into a hole formed in the bottom portion of the second cylindrical member 2163. The needle 2164 has an annular protrusion 2173 protruded from the outer wall in the outward radial direction. The inlet valve member 2165 is formed in a disk shape and is provided in the inlet valve body 2161.

The stopper 2166 is cup-shaped and is provided in such a manner as to confront the pressurization chamber 2031. The inlet valve member 2165 is so provided that it can be reciprocatively moved in the axial direction between the inlet valve body 2161 and the stopper 2166. Therefore, the inlet valve member 2165 can be abutted against the inlet valve seat 2171 of the inlet valve body 2161. The inlet valve member 2165 can be abutted against the stopper 2166. One end of the needle 2164 can be abutted against the center of the plane of the inlet valve member 2165 on one side.

The inlet valve member 2165 is unseated from the inlet valve seat 2171 of the inlet valve body 2161 or is seated on the inlet valve seat 2171, whereby the suction passage 2043 is opened or closed.

The first spring 2167 is provided between the bottom portion of the second cylindrical member 2163 and the annular protrusion 173 of the needle 2164 to biases the needle 2164 toward the stopper 2166. The second spring 2168 is provided between the bottom portion of the stopper 2166 and the inlet valve member 2165 to biases the inlet valve member 2165 toward the needle 2164. In the present embodiment, the biasing force of the first spring 2167 is larger than that of the second spring 2168. Without external force exerted on the needle 2164, the inlet valve member 2165 is biased in the valve opening direction by the first spring 2167 and is pressed against the stopper 2166. That is, at this time, the inlet valve member 2165 is opened.

An electromagnetic driving unit 2018 is provided in the inlet valve portion 2016. The electromagnetic driving unit 2018 includes a movable core 2181, a fixed core 2182, a coil 2183, and the like. The movable core 2181 is made from magnetic material and is press-inserted into the end of the needle 2164. As a result, the movable core 2181 can be reciprocatively moved in the axial direction together with the needle 2164.

The fixed core 2182 is made from magnetic material. A cylindrical member 2185 made from nonmagnetic material is provided between the fixed core 2182 and the first cylindrical member 2162.

The coil 2183 is formed around the movable core 2181 and the fixed core 2182. The coil 2183 is covered with a molded portion 2184 formed of a resin material. The molded portion 2184 includes a connector portion 2191 which protrudes from the outer wall in the outward radial direction. A terminal 2192 is insert-molded in the connector portion 2191. The terminal 2192 and the coil 2183 are electrically connected with each other.

The molded portion 2184 is covered with a first cover member 2193 and a second cover member 2194. The first cover member 2193 is formed in the shape of a closed-end cylinder and its bottom portion is abutted against the fixed core 2182. The first cover member 2193 is made from magnetic material. The second cover member 2194 is a plate made from magnetic material and has a hole in the center thereof. The end of the first cylindrical member 2162 is inserted into this center hole. The second cover member 2194 and the first cylindrical member 2162 are abutted against each other. The second cover member 2194 is abutted against the end of the first cover member 2193.

When the coil 2183 is energized through the terminal 2192, it generates a magnetic field. When a magnetic field is generated in the coil 2183, a magnetic circuit is formed in the fixed core 2182, the first cover member 2193, the second cover member 2194, the first cylindrical member 2162, and the movable core 2181. The movable core 2181 is attracted toward the fixed core 2182 together with the needle 2164. This magnetic circuit is so formed that it goes around the cylindrical member 2185 which is made from nonmagnetic material.

When the coil 2183 is not energized, the inlet valve member 2165 is biased toward the pressurization chamber 2031 through the needle 2164 by the biasing force of the first spring 2167 and is abutted against the stopper 2166. Since the inlet valve member 2165 is away from the inlet valve seat 2171 at this time, the flows of fuel in the suction passage 2043 and the suction port 2032 are permitted. Meanwhile, when the coil 2183 is energized and the movable core 2181 and the needle 2164 are attracted toward the fixed core 2182, the inlet valve member 2165 is biased to the inlet valve seat 2171 by the biasing force of the second spring 2168. As a result, the flows of fuel in the suction passage 2043 and the suction port 2032 are interrupted.

As mentioned above, the inlet valve portion 2016 can permit or interrupt the flows of fuel in the suction passage 2043 and the suction port 2032 by the actuation of the electromagnetic driving unit 2018. In this embodiment, the electromagnetic driving unit 2018 and the inlet valve portion 2016 form a normally-open-valve mechanism.

Figure 14A:
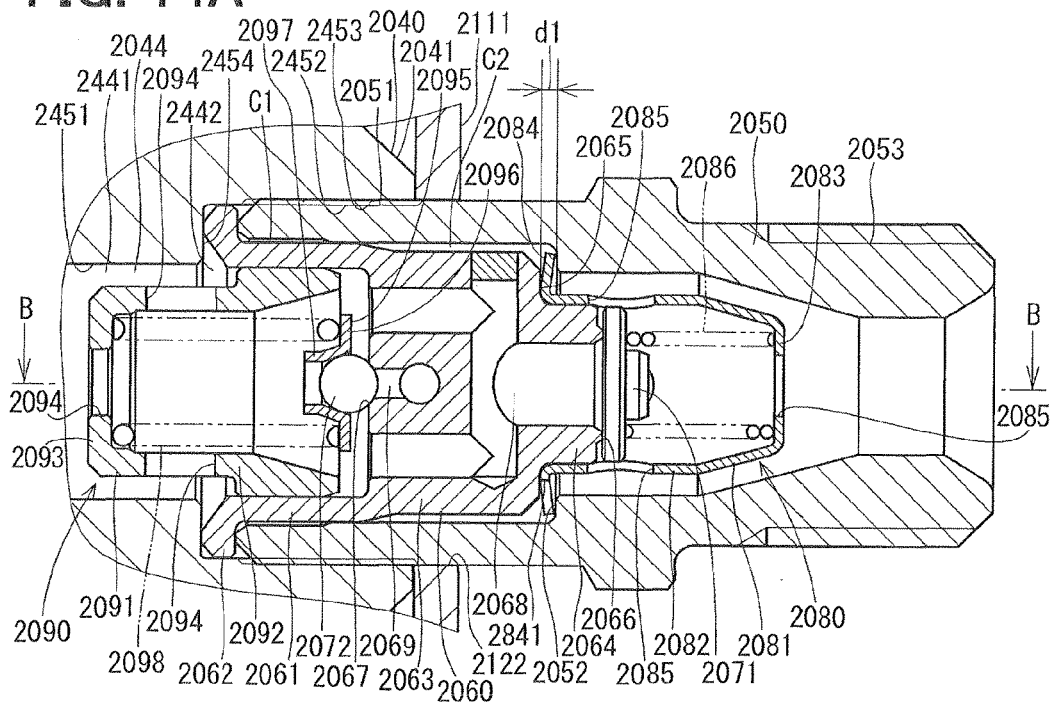
FIG. 14A is a sectional view illustrating a vicinity of the valve body of a high-pressure pump.
Figure 14B:
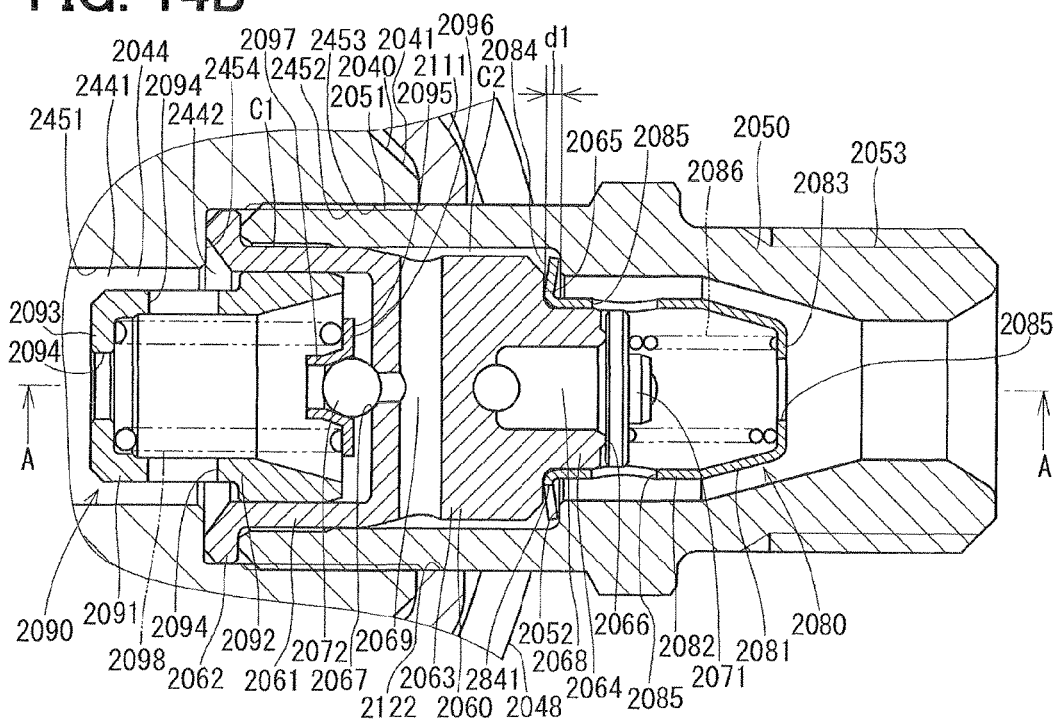
FIG. 14B is a sectional view illustrating a vicinity of the valve body of a high-pressure pump.

With reference to FIGS. 14A and 14B, the cylindrical member 2050, valve body 2060, the discharge valve member 2071, the relief valve member 2072, the discharge valve energizing means 2080, and the relief valve energizing means 2090 will be described in detail.

The cylindrical member 2050 is made from stainless steel. The cylindrical member 2050 is inserted into the hole 2122 in the cylindrical portion 2111 of the cover member 2011. Its one end is positioned inside of the second inner wall surface 2452 of the upper housing 2041. More specifically, an outside thread groove 2051 corresponding to the inside thread groove 2453 in the second inner wall surface 2452 is formed in the outer wall of one end of the cylindrical member 2050. One end of the cylindrical member 2050 is screwed to inside of the second inner wall surface 2452.

The cylindrical member 2050 has a stepped surface 2052 formed between one end and the other end thereof. The cylindrical member 2050 is formed in such a manner that the inside diameter of the extreme end is larger than those of the other portion. The stepped surface 2052 corresponds to a "first stepped surface."

A thread groove 2053 is formed in the outer wall of the cylindrical member 2050 and the fuel pipe connected to the delivery pipe is connected thereto. The outer wall of the cylindrical member 2050 and an inner periphery of the hole 2122 in the cover member 2011 are welded together. The liquid tightness of the fuel gallery 2113 is thereby maintained.

The valve body 2060 is formed of metal, such as stainless steel and includes a cylindrical portion 2061, a flange portion 2062, a first valve-seat-forming portion 2063, a second valve-seat-forming portion 2064, a stepped surface 2065, a discharge valve seat 2066, a relief valve seat 2067, a discharge valve passage 2068, a relief valve passage 2069, and the like.

The cylindrical portion 2061 is accommodated in the cylindrical member 2050. The cylindrical member 2050 is formed in such a manner that the inside diameter of the extreme end is larger than those of the other portions. Therefore, a part of the outer wall of the cylindrical portion 2061 is in contact with an inner wall surface of the cylindrical member 2050. As a result, an annular clearance C1 is formed between the outer wall of the cylindrical portion 2061 and the inner wall of the cylindrical member 2050. In this embodiment, the outside diameter of the cylindrical portion 2061 is slightly larger than the inside diameter of the portion of the cylindrical member 2050. For this reason, the cylindrical portion 2061 is lightly inserted into the cylindrical member 2050.

The flange portion 2062 is annularly formed in such a manner as to extend from the end of the cylindrical portion 2061 in the outward radial direction. The flange portion 2062 is sandwiched between one end of the cylindrical member 2050 and the stepped surface 2454 of the upper housing 2041. The one end of the cylindrical member 2050 is screwed to inside the second inner wall surface 2452 so that a contact pressure of a predetermined value is exerted on the area between the cylindrical member 2050 and the flange portion 2062 and the area between the flange portion 2062 and the stepped surface 2454.

As illustrated in FIGS. 14A and 14B, the flange portion 2062 is formed in such a manner that its inner edge portion and its outer edge portion are tapered. The contacting area between the flange portion 2062 and the stepped surface 2454 is smaller than the maximum value of the sectional area of the flange portion 2062. The cylindrical member 2050 is also formed in such a manner that its inner edge portion and its outer edge portion are tapered. The contacting area between the cylindrical member 2050 and the flange portion 2062 is smaller than the maximum value of the sectional area of the flange portion 2062. Thereby, it possible to increase the contact pressure exerted on the area between the flange portion 2062 and the stepped surface 2454 and the area between the cylindrical member 2050 and the flange portion 2062.

The first valve-seat-forming portion 2063 is formed in a shape of a solid cylinder. The portion 2063 closes the end of the cylindrical portion 2061. The outside diameter of the first valve-seat-forming portion 2063 is set in such a manner that it is smaller than the outside diameter of the cylindrical portion 2061 and the inside diameter of the cylindrical member 2050. For this reason, an annular clearance C2 is formed between the outer wall of the first valve-seat-forming portion 2063 and the inner wall of the cylindrical member 2050. This clearance C2 corresponds to a "clearance" of the present invention.

The second valve-seat-forming portion 2064 is formed in such a manner as to protrude from the first valve-seat-forming portion 2063 in a direction apart from the cylindrical portion 2061. The outside diameter of the second valve-seat-forming portion 2064 is smaller than the outside diameter of the first valve-seat-forming portion 2063. As a result, an annular stepped surface 2065 is formed on the wall surface of the first valve seat formation portion 2063. This stepped surface 2065 corresponds to a "second stepped surface." In this embodiment, the distance between the stepped surface 2065 and the stepped surface 2052 of the cylindrical member 2050 is set to a predetermined distance "d1".

The first valve-seat-forming portion 2063 and the second valve-seat-forming portion 2064 correspond to a "valve-seat-forming portion."

The discharge valve seat 2066 is formed on an end face of the second valve-seat-forming portion 2064. The relief valve seat 2067 is formed on the end face of the first valve-seat-forming portion 2063. The discharge valve seat 2066 and the relief valve seat 2067 are annularly formed.

The discharge valve passage 2068 is formed in the second valve-seat-forming portion 2064 and the first valve-seat-forming portion 2063 so that the discharge valve seat 2066 and the end face of the first valve-seat-forming portion 2063 are connected with each other. The relief valve passage 2069 is formed in the first valve-seat-forming portion 2063 so that the relief valve seat 2067 and the outer wall of the first valve-seat-forming portion 2063 are connected with each other. That is, the relief valve passage 2069 is formed so that its end opposite to the relief valve seat 2067 is connected to the clearance C2. The relief valve passage 2069 does not communicate with the discharge valve passage 2068.

The discharge valve member 2071 is a disk made from stainless steel. The discharge valve member 2071 is arranged in such a manner as to abut against the discharge valve seat 2066. The relief valve member 2072 is formed in a spherical shape. The relief valve member 2072 is so provided that it can be abutted against the relief valve seat 2067.

The discharge valve biasing portion 2080 is comprised of a holder 2081 and a spring 2086. The holder 2081 is formed by pressing sheet metal of stainless steel and is provided inside of the cylindrical member 2050. The holder 2081 includes a holder cylindrical portion 2082, a holder bottom portion 2083, a holder flange portion 2084, and through holes 2085.

The holder cylindrical portion 2082 is so provided that the second valve-seat-forming portion 2064 is inserted into one end thereof. The inside diameter of the holder cylindrical portion 2082 and the outside diameter of the second valve seat formation portion 2064 are substantially identical with each other. Therefore, the holder cylindrical portion 2082 and the second valve seat formation portion 2064 are loosely fit together. The inside diameter of the holder cylindrical portion 2082 is slightly larger than the outside diameter of the discharge valve member 2071. For this reason, the discharge valve member 2071 can be reciprocatively moved in the holder cylindrical portion 2082. The holder bottom portion 2083 closes the other end of the holder cylindrical portion 2082.

The holder flange portion 2084 is annularly formed so that it is extended from the one end of the holder cylindrical portion 2082 in the outward radial direction. The holder flange portion 2084 is sandwiched between the stepped surface 2052 of the cylindrical member 2050 and the stepped surface 2065 of the first valve seat formation portion 2063. The holder flange portion 2084 is so set that its plate thickness is smaller than the distance "d1" between the stepped surface 2052 and the stepped surface 2065 and its outer edge portion is bent toward the stepped surface 2052. For this reason, the holder flange portion 2084 can be elastically deformed between the stepped surface 2052 and the stepped surface 2065. As a result, a force of a predetermined value is constantly exerted on the holder flange portion 2084 from the stepped surface 2052 and the stepped surface 2065.

Multiple cutout grooves 2841 are formed in the outer edge portion of the holder flange portion 2084 in the circumferential direction. The relief valve passage 2069, the clearance C2 and an inner space of the cylindrical member 2050 communicate with each other through the cutout grooves 841. One of the through holes 2085 is formed in the holder bottom portion 2083 and the others are formed in the holder cylindrical portion 2082 in the circumferential direction. The inside and outside of the holder 2081 communicate with each other through the holes 2085.

The spring 2086 is provided between the discharge valve member 2071 and the holder bottom portion 2083. The spring 2086 is a coil spring and one end thereof is engaged with the discharge valve member 2071 and the other end thereof is engaged with the holder bottom portion 2083. As a result, the spring 2086 biases the discharge valve member 2071 to abut against the discharge valve seat 2066. That is, the spring 2086 biases the discharge valve member 2071 in the seating direction. The spring 2086 corresponds to a "discharge valve biasing member."

The relief valve energizing means 2090 is comprised of a holder 2091, a valve holding member 2095, and a spring 2098. The holder 2091 is formed in the shape of a closed-end cylinder of metal, such as stainless steel. The holder 2091 includes a holder cylindrical portion 2092, a holder bottom portion 2093 and through holes 2094. The holder bottom portion 2093 closes the end of the holder cylindrical portion 2092. The holder 2091 is configured in such a manner that the outer wall of the holder cylindrical portion 2092 is fit or welded to the inner wall of the cylindrical portion 2061 of the valve body 2060. One of the through holes 2094 is formed in the holder bottom portion 2093 and the others are formed in the holder cylindrical portion 2092 in the circumferential direction. The inside and outside of the holder 2091 communicate with each other through the through holes 2094.

The valve holding member 2095 is comprised of an annular plate portion 2096 and a cylindrical portion 2097. The cylindrical portion 2097 cylindrically extends from the inner edge end of the plate portion 2096 toward the pressurization chamber 2031. The inner wall of the cylindrical portion 2097 is tapered so that its diameter is reduced toward the pressurization chamber 2031. The relief valve member 2072 is held inside of the tapered inner wall of the cylindrical portion 2097.

The spring 2098 is arranged between the valve holding member 2095 and the holder bottom portion 2093. The spring 2098 is a coil spring. One end thereof is engaged with the valve holding member 2095 and the other end is engaged with the holder bottom portion 2093. As a result, the spring 2098 biases the relief valve member 2072 through the valve holding member 2095 so as to abut against the relief valve seat 2067. That is, the spring 2098 biases the relief valve member 2072 in the seating direction.

As mentioned above, the cylindrical member 2050 and the valve body 2060 are kept joined with each other. The valve body 2060 and the holder 2091 are kept joined with each other by fitting or welding. With this configuration, these members can be configured as a sub-assembly by assembling the cylindrical member 2050, the valve body 2060, the discharge valve member 2071, the relief valve member 2072, the discharge valve biasing portion 2080, and the relief valve biasing portion 2090. Therefore, the assembly of the high-pressure pump 2001 can be facilitated.

An operation of the high-pressure pump 2001 will be described hereinafter.

[Suction Stroke]

When the plunger 2020 is moved downward in FIG. 11, the energization of the coil 2183 has been stopped. For this reason, the inlet valve member 2165 is biased toward the pressurization chamber 2031 by the needle 2164 receiving a force from the first spring 2167. As a result, the inlet valve member 2165 is away from the inlet valve seat 2171 of the inlet valve body 2161. When the plunger 2020 is moved downward in FIG. 11, the pressure in the pressurization chamber 2031 is reduced. For this reason, the force which the inlet valve member 2165 receives from the fuel at the inlet valve seat 2171 is larger than the force which the inlet valve member 2165 receives from the fuel in the pressurization chamber 2031. As a result, the force is applied to the inlet valve member 2165 in a direction away from the inlet valve seat 2171. The inlet valve member 2165 is moved until it is abutted against the stopper 2166. When the inlet valve member 2165 is away from the inlet valve seat 2171, the fuel gallery 2113 communicates with the pressurization chamber 2031 through the through holes 2045, the through holes 2172, the inside of the inlet valve body 2161 and the suction port 2032. Consequently, the fuel in the fuel gallery 2113 is suctioned into the pressurization chamber 2031 by way of the through holes 2045 and the through holes 2172 in this order.

[Metering Stroke]

When the plunger 2020 ascends from the bottom dead center toward the top dead center, a fuel pressure force is applied to the inlet valve member 2165 in a direction in which the inlet valve member 2165 is abutted against the inlet valve seat 2171. However, when the coil 2183 is not energized, the needle 2164 is biased toward the inlet valve member 2165 by the biasing force of the first spring 2167. For this reason, the movement of the inlet valve member 2165 toward the inlet valve seat 2171 is restricted by the needle 2164. The inlet valve member 2165 is covered with the stopper 2166. As a result, the flow of fuel discharged from the pressurization chamber 2031 to the fuel gallery 2113 does not directly collide with the inlet valve member 2165. For this reason, the force applied to the inlet valve member 2165 in the valve closing direction is reduced.

In the metering stroke, the inlet valve member 2165 is kept away from the inlet valve seat 2171 while the energization of the coil 2183 is stopped. As a result, the fuel discharged from the pressurization chamber 2031 is returned to the fuel gallery 2113 by way of the through holes 2172 and the through holes 2045 in this order.

When the coil 2183 is energized in the metering stroke, a magnetic circuit is formed through the fixed core 2182, the first cover member 2193, the second cover member 2194, the first cylindrical member 2162 and the movable core 2181. As a result, magnetic attractive force is produced between the fixed core 2182 and the movable core 2181. When the magnetic attractive force produced between the fixed core 2182 and the movable core 2181 becomes larger than the biasing force of the first spring 2167, the movable core 2181 is moved toward the fixed core 2182. For this reason, the needle 2164 integrated with the movable core 2181 is also moved toward the fixed core 2182. When the needle 2164 is moved toward the fixed core 2182, the inlet valve member 2165 and the needle 2164 are away from each other. The inlet valve member 2165 does not receive any forces from the needle 2164. As a result, the inlet valve member 2165 is moved away from the stopper 2166 and moved toward the inlet valve seat 2171. As a result, the inlet valve member 2165 is closed.

When the plunger 2020 ascends, the quantity of fuel returned from the pressurization chamber 2031 to the fuel gallery 2113 is adjusted by closing the suction passage 2043 between the pressurization chamber 2031 and the fuel gallery 2113. As a result, the quantity of fuel pressurized in the pressurization chamber 2031 is determined. When the inlet valve member 2165 is moved toward the inlet valve seat 2171 and the inlet valve member 2165 is abutted against the inlet valve seat 2171, the flow of fuel flowing in the suction passage 2043 is interrupted. This terminates the metering stroke of discharging fuel from the pressurization chamber 2031 to the fuel gallery 2113.

[Pressurizing Stroke]

When the plunger 2020 further ascends toward the top dead center with the suction passage 2043 closed, the pressure of fuel in the pressurization chamber 2031 is increased. When the pressure of fuel in the pressurization chamber 2031 becomes higher than or equal to a predetermined value, the discharge valve member 2071 is moved away from the discharge valve seat 2066 against the biasing force of the spring 2086 and the fuel pressure force which the discharge valve member 2071 receives. As a result, the discharge valve member 2071 is opened and the fuel pressurized in the pressurization chamber 2031 is discharged from the high-pressure pump 2001 by way of the discharge valve passage 2068 and an inner space of the valve body 2060. The fuel discharged from the high-pressure pump 2001 is supplied to the delivery pipe, (not shown).

When the pressure in the cylindrical member 2050 becomes higher than or equal to a predetermined value, the relief valve member 2072 is moved away from the relief valve seat 2067 against the biasing force of the spring 2098 and the fuel pressure force which the relief valve member 2072 receives. As a result, the relief valve member 2072 is opened. The fuel in the interior of the cylindrical member 2050 is returned to the pressurization chamber 2031 by way of the relief valve passage 2069.

When the plunger 2020 is moved up to the top dead center, the energization of the coil 2183 is stopped and the inlet valve member 2165 is moved away from the inlet valve seat 2171 again. The plunger 2020 is moved downward in FIG. 11 again and the pressure of fuel in the pressurization chamber 2031 is reduced. As a result, the fuel is suctioned from the fuel gallery 2113 to the pressurization chamber 2031.

When the inlet valve member 2165 is closed and the pressure of fuel in the pressurization chamber 2031 rises to the predetermined value, the energization of the coil 2183 may be stopped. When the pressure of fuel in the pressurization chamber 2031 rises, the fuel pressure force which the inlet valve member 2165 receives in an opening direction becomes larger than the force which the inlet valve member 2165 receives in a close direction. For this reason, even when the energization of the coil 2183 is stopped, the inlet valve member 2165 is kept abutted against the inlet valve seat 2171 by the force from the fuel in the pressurization chamber 2031. The power consumption of the electromagnetic driving unit 2018 can be reduced by stopping the energization of the coil 2183 at a predetermined time point as mentioned above.

The high-pressure pump 2001 pressurizes and discharges suctioned fuel by repeating the above-mentioned "suction stroke," "metering stroke," and "pressurization stroke." The fuel discharge rate is adjusted by controlling the timing of energization of the coil 2183 of the electromagnetic driving unit 2018.

When the high-pressure pump 2001 is in operation, the pressure in the pressurization chamber 2031 is periodically changed. For this reason, a fuel pressure pulsation occurs in the fuel gallery 2113 communicating with the pressurization chamber 2031. In this embodiment, this fuel pressure pulsation is suppressed by providing the fuel gallery 2113 with the pulsation damper 2004.

In the pressurization stroke, the valve body 2060 receives fuel pressure from the pressurization chamber 2031. When the pressure inside of the cylindrical member 2050 rises, the valve body 2060 receives a fuel pressure from the opposite side. When the high-pressure pump 2001 is in operation, as mentioned above, the fuel pressure force is repeatedly exerted on the valve body 2060 in the axial direction. In this embodiment, however, the valve body 2060 has the flange portion 2062 sandwiched between the stepped surface 2454 of the upper housing 2041 and one end of the cylindrical member 2050. Therefore, the axial movement thereof relative to the upper housing 2041 is restricted.

In this embodiment, the valve body 2060 includes: the cylindrical portion 2061 housed inside of the cylindrical member 2050; the flange portion 2062 extended from the cylindrical portion 2061 in the outward radial direction and sandwiched between the one end of the cylindrical member 2050 and the stepped surface 2454 of the housing 2040; the first valve-seat-forming portion 2063 and second valve-seat-forming portion 2064 closing the end of the cylindrical portion 2061; the discharge valve seat 2066 formed on the wall surface of the second valve-seat-forming portion 2064; and the discharge valve passage 2068 that connects together the discharge valve seat 2066 and the wall surface of the first valve-seat-forming portion 2063.

The discharge valve member 2071 is unseated from the discharge valve seat 2066 or seated on the discharge valve seat 2066 and can thereby open or close the discharge valve passage 2068.

According to the above configuration, the valve body 2060 is configured in such a manner that the flange portion 2062 is sandwiched between the stepped surface 2454 of the housing 2040 and one end of the cylindrical member 2050. The valve body 2060 is held in the housing 2040 with axial force exerted on its flange portion 2062 from the stepped surface 2454 of the housing 2040 and the one end of the cylindrical member 2050. As a result, the axial movement of the valve body 2060 relative to the housing 2040 is restricted. The discharge pressure of the high-pressure pump 2001 can be stabilized.

It is restricted that a force is exerted on the valve body 2060 in the inward radial direction. It is restricted that a force is exerted on the first valve-seat-forming portion 2063 and second valve-seat-forming portion 2064 in the inward radial direction. Thus, it is restricted that the first valve-seat-forming portion 2063 and the second valve-seat-forming portion 2064 are deformed. Therefore, it is possible to maintain the tight abutment between the discharge valve seat 2066 and the discharge valve member 2071. The discharge pressure of the high-pressure pump 2001 can be further stabilized.

In this embodiment, the housing 2040 has the inner wall surface that accommodates the cylinder 2030 and forms the discharge passage 2044 communicating with the discharge port 2033. The cylindrical member 2050 is provided in such a manner as to be positioned inside of the above inner wall surface of the housing 2040. It has the stepped surface 2052 formed between the one end and the other end.

The valve body 2060 includes: the cylindrical portion 2061; the first valve-seat-forming portion 2063; the second valve-seat-forming portion 2064; the stepped surface 2065 formed on the wall surface of the first valve-seat-forming portion 2063; the discharge valve seat 2066; and the discharge valve passage 2068 connecting the discharge valve seat 2066 and the wall surface of the first valve-seat-forming portion 2063.

The discharge valve member 2071 is unseated from the discharge valve seat 2066 or seated on the discharge valve seat 2066 and can thereby open or close the discharge valve passage 2068.

The holder 2081 includes: the holder cylindrical portion 2082 having the second valve-seat-forming portion 2064; the holder bottom portion 2083; and the holder flange portion 2084 extended from the holder cylindrical portion 2082. The holder flange portion 2084 is sandwiched between the stepped surface 2052 of the cylindrical member 2050 and the stepped surface 2065 of the valve body 2060. Further, the holder 2081 includes the through holes 2085 formed at least either of the holder cylindrical portion 2082 and the holder bottom portion 2083.

The spring 2086 is arranged between the discharge valve member 2071 and the holder bottom portion 2083 to biases the discharge valve member 2071 in the seating direction. The spring 2086 is held by the holder 2081 and forms the discharge valve biasing portion 2080 together with the holder 2081.

The holder 2081 is so provided that its holder flange portion 2084 is sandwiched between the stepped surface 2052 of the cylindrical member 2050 and the stepped surface 2065 of the valve body 2060 inside the cylindrical member 2050. The holder 2081 is held with axial force exerted on its holder flange portion 2084 from the stepped surface 2052 and the stepped surface 2065. The axial movement of the holder 2081 relative to the cylindrical member 2050 is restricted.

Also, it is restricted that the holder 2081 receives a force in the inward radial direction. Therefore, it is restricted that a force is exerted on the second valve-seat-forming portion 2064 from the inner wall of the holder 2081. It is restricted that the second valve-seat-forming portion 2064 is deformed. Therefore, it is possible to maintain the tight abutment between the discharge valve seat 2066 and the discharge valve member 2071. The discharge pressure of the high-pressure pump 2001 can be stabilized.

In this embodiment, the holder 2081 is formed by pressing sheet metal. For this reason, the holder 2081 can be easily manufactured. Therefore, it is possible to reduce the manufacturing cost of the high-pressure pump 2001.

In this embodiment, the outer edge portion of the holder flange portion 2084 is bent toward the stepped surface 2052 of the cylindrical member 2050. Thus, it can be elastically deformed between the stepped surface 2052 of the cylindrical member 2050 and the stepped surface 2065 of the valve body 2060. As a result, even when the cylindrical member 2050 and/or the valve body 2060 is deformed by heat or pressure, a force of a predetermined value is constantly exerted on the holder flange portion 2084 of the holder 2081. Therefore, it is restricted that the holder 2081 is worn away.

In this embodiment, the valve body 2060 includes the relief valve seat 2067 and the relief valve passage 2069. The relief valve seat 2067 is formed on the wall surface of the first valve-seat-forming portion 2063. The relief valve passage 2069 connects the relief valve seat 2067 and the wall surface of the first valve-seat-forming portion 2063. The relief valve seat passage 2069 does not communicate with the discharge valve passage 2068.

This embodiment further includes the relief valve member 2072 and the relief valve biasing portion 2090. The relief valve member 2072 is unseated from the relief valve seat 2067 or seated on the relief valve seat 2067 to open or close the relief valve passage 2069. The relief valve biasing portion 2090 biases the relief valve member 2072 in the seating direction. In this embodiment, it is restricted that a force is exerted on the second valve-seat-forming portion 2064 from the inner wall of the holder 2081, whereby a deformation of the second valve-seat-forming portion 2064 is restricted. A deformation of the first valve-seat-forming portion 2063 connected to the second valve-seat-forming portion 2064 is also restricted.

Therefore, it is possible to maintain the tight abutment between the relief valve seat 2067 and the relief valve member 2072. The relief pressure of the high-pressure pump 2001 can be stabilized.

In this embodiment, the annular clearance C2 is formed between the outer wall of the first valve-seat-forming portion 2063 and the inner wall of the cylindrical member 2050. For this reason, it can be avoided that a force is exerted on the first valve-seat-forming portion 2063 in the inward radial direction from the inner wall of the cylindrical member 2050. This makes it possible to further suppress a deformation of the first valve seat formation portion 2063. Therefore, it is possible to maintain the tight abutment between the relief valve seat 2067 and the relief valve member 2072. As a result, the relief pressure of the high-pressure pump 2001 can be further stabilized.

In this embodiment, the exertion of force in the inward radial direction on the first valve-seat-forming portion 2063 is suppressed and thus the deformation of the first valve-seat-forming portion 2063 is suppressed. Therefore, it is possible to maintain the tight abutment between the relief valve seat 2067 and the relief valve member 2072. The relief pressure of the high-pressure pump 2001 can be stabilized.

In this embodiment, the annular clearance C2 is formed between the outer walls of the first valve-seat-forming portion 2063 and second valve-seat-forming portion 2064 and the inner wall of the cylindrical member 2050. For this reason, it can be surely avoided that a force is exerted on the first valve-seat-forming portion 2063 and the second valve-seat-forming portion 2064 in the inward radial direction from the inner wall of the cylindrical member 2050. It is possible to further suppress deformations of the first valve-seat-forming portion 2063 and the second valve-seat-forming portion 2064.

In this embodiment, the relief valve passage 2069 is formed so that its end opposite to the relief valve seat 2067 is connected to the clearance C2. For this reason, the clearance C2 can be used as part of the fuel flow path for discharging the fuel to the pressurization chamber 2031. This makes it possible to shorten the passage length of the relief valve passage 2069 formed in the first valve-seat-forming portion 2063 and the second valve-seat-forming portion 2064. Therefore, it is possible to reduce the volumetric capacity of the space (relief valve passage 2069) formed in the first valve-seat-forming portion 2063 and the second valve-seat-forming portion 2064. This makes it possible to enhance the strength of each of the first valve-seat-forming portion 2063 and the second valve-seat-forming portion 2064.

At least one cutout groove 841 is formed in the outer edge portion of the holder flange portion 2084. With this configuration, the clearance C2 and the cutout grooves 841 can be used as part of the fuel flow path for discharging the fuel into the pressurization chamber 2031. This makes it possible to shorten the passage length of the relief valve passage 2069 formed in the first valve-seat-forming portion 2063 and the second valve-seat-forming portion 2064. Therefore, it is possible to reduce the volumetric capacity of the space (relief valve passage 2069) formed in the first valve-seat-forming portion 2063 and the second valve-seat-forming portion 2064. This makes it possible to enhance the strength of each of the first valve-seat-forming portion 2063 and the second valve-seat-forming portion 2064.

In the present embodiment, the inner wall surface of the housing 2040 includes the first inner wall surface 2451 and the second inner wall surface 2452. The housing 2040 has the stepped surface 2454 formed between the first inner wall surface 2451 and the second inner wall surface 2452. The valve body 2060 is so provided that the end of the cylindrical portion 2061 is positioned in proximity to the stepped surface 2454. As a result, even when the pressure is exerted on the valve body 2060, the end of the cylindrical portion 2061 is engaged with the stepped surface 2454 so that the movement of the valve body 2060 toward the pressurization chamber 2031 is restricted. For this reason, the relief pressure of the high-pressure pump 2001 can be stabilized.

In the present embodiment, the valve body 2060 includes the flange portion 2062. The flange portion 2062 extends from the end of the cylindrical portion 2061 in the outward radial direction in such a manner as to be sandwiched between one end of the cylindrical member 2050 and the stepped surface 2454 of the housing 2040. The valve body 2060 is held in the housing 2040 with axial force exerted on the flange portion 2062. As a result, the axial movement of the valve body 2060 relative to the housing 2040 is restricted. For this reason, the discharge pressure and relief pressure of the high-pressure pump 2001 can be stabilized.

The exertion of force in the inward radial direction on the valve body 2060 is suppressed. Thus a deformation of the valve body 2060 is suppressed. Therefore, it is possible to maintain the tight abutment between the discharge valve seat 2066 and the discharge valve member 2071 and between the relief valve seat 2067 and the relief valve member 2072. It is possible to further stabilize the discharge pressure and relief pressure of the high-pressure pump 2001.

In this embodiment, the inside thread groove 2453 is formed in the second inner wall surface 2452 of the housing 2040. The cylindrical member 2050 has the outside thread groove 2051 corresponding to the inside thread groove 2453. One end of the cylindrical member 2050 is screwed to inside of the second inner wall surface 2452. This makes it possible to continuously exert an axial force on the flange portion 2062 of the valve body 2060 from the one end of the cylindrical member 2050. Since the inside thread groove 2453 and the outside thread groove 2051 are engaged with each other, the cylindrical member 2050 does not moves out from the second inner wall surface 2452 of the housing 2040. For this reason, the valve body 2060 is prevented from moving out from inside of the second inner wall surface 2452 by the cylindrical member 2050 even when the pressure on the valve body 2060 is increased and a pressure force is exerted on the valve body 2060.

In this embodiment, the area of abutment between the flange portion 2062 and the stepped surface 2454 is smaller than the maximum value of the sectional area of the flange portion 2062. This makes it possible to increase a contact pressure between the flange portion 2062 and the stepped surface 2454. For this reason, it is liquid-tightly sealed between the valve body 2060 and the housing 2040. A leakage of fuel can be suppressed and a reduction in discharge pressure can be suppressed.

In this embodiment, the contacting area between the cylindrical member 2050 and the flange portion 2062 is smaller than the maximum value of the sectional area of the flange portion 2062. This makes it possible to increase a contact pressure between the cylindrical member 2050 and the flange portion 2062. For this reason, it is liquid-tightly sealed between the cylindrical member 2050 and the valve body 2060. A leakage of fuel can be suppressed and a reduction in discharge pressure can be suppressed.

Other Embodiment

In the above embodiments, the relief valve passage is connected to the clearance between the first valve-seat-forming portion and the inner wall of the cylindrical member. In another embodiment, the relief valve passage is not connected to the above clearance. The clearance may be not formed between the outer wall of the valve-seat-forming portion and the inner wall of the cylindrical member.

The holder of the discharge valve biasing portion may not have a holder flange portion. In this case, the holder is fixed on the valve body by joining the holder cylindrical portion to the outer wall of the second valve seat formation portion by welding. The valve body may not have a second valve-seat-forming portion. In this case, the discharge valve seat is formed in the first valve-seat-forming portion.

The inside thread groove and the outside thread groove may not be formed in the housing and the cylindrical member. The cylindrical member may be press-inserted into the second inner wall surface of the housing.

The inner edge portion and the outer edge portion of the flange portion may be not tapered. That is, the contacting area between the flange portion and the stepped surface of the housing may be larger than or equal to the value of the sectional area of the flange portion.

The inner edge portion and the outer edge portion of the cylindrical member may be not tapered. That is, the contacting area between the cylindrical member and the flange portion of the valve body may be approximately equal to the sectional area of the flange portion.

The valve body may not have a relief valve seat nor a relief valve passage. The relief valve member and the relief valve biasing portion may be not provided.

At least two of the cylinder, the upper housing, and the lower housing may be integrally formed. The cover member may be formed integrally with the upper housing or the lower housing.

The electromagnetic driving unit and the inlet valve portion may be configured as a normally-closed valve mechanism. In a case that the inlet valve portion is a normally-closed valve mechanism, the electromagnetic driving unit is not always necessary.

The pulsation damper may not be provided inside of the cover member. The cover member is not always necessary. In a case that no cover member is provided, the fuel may be directly supplied to the suction passage of the housing.

The holder that holds the discharge valve biasing member may be formed by casting or cutting a metal material. The outer edge portion of the holder flange portion of the holder may not be elastically bent.

The end of the relief valve passage may not be connected to the clearance. The relief valve passage may be formed on an end surface of the second valve forming portion opposite to the pressurization chamber. The clearance may not be formed between the outer wall of the first valve-seat-forming portion and the inner wall of the cylindrical member. Only one cutout groove may be formed in the holder flange portion. Alternatively, no cutout groove may be formed in the holder flange portion.

The valve body may not have a flange portion. In this configuration, it is desirable that the end of the cylindrical portion of the valve body should be abutted against the stepped surface between the first inner wall surface and second inner wall surface of the housing.

The high-pressure pump may be used as a fluid pump that discharges a fluid to a device other than an engine.

The invention is not limited to the above-mentioned embodiments and can be embodied in various modes without departing from the subject matter thereof.

What is claimed is:

1. A high-pressure pump comprising:
    a plunger configured to perform a reciprocating movement;
    a cylinder that receives the plunger and defines a pressurization chamber with the plunger;
    a housing that accommodates the cylinder and includes a valve body, the valve body including a discharge valve inlet and a relief valve outlet which communicate with a fuel passage, a single discharge valve outlet, a plurality of relief valve inlets, a single first discharge valve passage, a plurality of second discharge valve passages configured to fluidly connect the discharge valve inlet and the single discharge valve outlet, and a plurality of relief valve passages that communicate with the plurality of relief valve inlets and the relief valve outlet to discharge a fuel pressurized in the pressurization chamber, the relief valve passage being fluidly disconnected from the second discharge valve passages;
    a discharge valve seat formed on an end face of the valve body opposite to the pressurization chamber;
    a relief valve seat formed on another end face of the valve body confronting the pressurization chamber;
    a discharge valve member configured to abut against the discharge valve seat;
    a relief valve member provided in series with the discharge valve member in a direction of an axis of the valve body, the relief valve member being configured to abut against the relief valve seat; a discharge valve biasing portion that biases the discharge valve member in a direction in which the discharge valve member is seated on the discharge valve seat; and
    a relief valve biasing portion that biases the relief valve member in a direction in which the relief valve member is seated on the relief valve seat, wherein,
    the plurality of second discharge valve passages are merged with the single first discharge valve passage between the plurality of second discharge valve passages and the single discharge valve outlet;
    wherein the plurality of relief valve passages are provided at equal intervals in a circumferential direction around a central axis of the valve body in such a manner as to communicate with the relief valve outlet.

2. A high-pressure pump according to claim 1, wherein
    the plurality of second discharge valve passages are formed in the valve body at equal intervals around an axial direction of the valve body, and
    a flow passage area of the single first discharge valve passage is greater than that of each second discharge valve passages.

3. A high-pressure pump according to claim 1 wherein
    the plurality of second discharge valve passages are configured in such a manner that the plurality of second discharge valve passages are shifted from the plurality of relief valve passages in a circumferential direction of the valve body.

4. A high-pressure pump according to claim 1, wherein
    a plurality of second discharge valve passages that communicate with a plurality of discharge valve inlets are provided at equal intervals in a circumferential direction around a central axis of the valve body in such a manner as to communicate with the single discharge valve outlet.

5. A high-pressure pump according to claim 1, wherein the discharge valve member or the relief valve member is in a substantially flat shape.

6. A high-pressure pump according to claim 1, wherein the discharge valve member or the relief valve member is in a substantially spherical shape.

7. A high-pressure pump according to claim 1, wherein the discharge valve member or the relief valve member is in a substantially conical shape.

8. A high-pressure pump according to claim 1, wherein a relief valve biasing holder abuts against an end of the relief valve biasing portion confronting the pressurization chamber, and a biasing force of the relief valve biasing portion is configured to be adjusted by varying a depth of insertion of the relief valve biasing holder into the valve body.

9. A high-pressure pump comprising:
a plunger configured to perform a reciprocating movement:
a cylinder that receives the plunger and defines a pressurization chamber with the plunger;
a housing that accommodates the cylinder and includes a valve body, the valve body including a discharge valve inlet and a relief valve outlet which communicate with a fuel passage, a single discharge valve outlet, a plurality of relief valve inlets, a single first discharge valve passage, a plurality of second discharge valve passages configured to fluidly connect the discharge valve inlet and the single discharge valve outlet, and a plurality of relief valve passages that communicate with the plurality of relief valve inlets and the relief valve outlet to discharge a fuel pressurized in the pressurization chamber, the plurality of relief valve passages being fluidly disconnected from the first discharge valve passage;
a discharge valve seat formed on an end face of the valve body opposite to the pressurization chamber;
a relief valve seat formed on another end face of the valve body confronting the pressurization chamber;
a discharge valve member configured to abut against the discharge valve seat;
a relief valve member provided in series with the discharge valve member in a direction of an axis of the valve body, the relief valve member being configured to abut against the relief valve seat;
a discharge valve biasing portion that biases the discharge valve member in a direction in which the discharge valve member is seated on the discharge valve seat; and
a relief valve biasing portion that biases the relief valve member in a direction in which the relief valve member is seated on the relief valve seat, wherein
the plurality of second discharge valve passages are merged with the single first discharge valve passage between the plurality of second discharge valve passages and the single discharge valve outlet;
wherein the plurality of relief valve passages are provided at equal intervals in a circumferential direction around a central axis of the valve body in such a manner as to communicate with the relief valve outlet.

10. A high-pressure pump according to claim 9, wherein a flow passage area of the single first discharge valve passage is greater than that of each second discharge valve passage.

* * * * *